US011766055B2

(12) United States Patent
Landström et al.

(10) Patent No.: US 11,766,055 B2
(45) Date of Patent: Sep. 26, 2023

(54) FOOD BAR ARRANGEMENT WITH A FOOD SAFETY ARRANGEMENT AND A FOOD BAR ARRANGEMENT ASSEMBLY

(71) Applicant: PICADELI AB, Gothenburg (SE)

(72) Inventors: Jonas Landström, Västra Frölunda (SE); Fredric Westerlund, Fotskäl (SE)

(73) Assignee: PICADELI AB, Gothenburg (SE)

( * ) Notice: Subject to any disclaimer, the term of this patent is extended or adjusted under 35 U.S.C. 154(b) by 0 days.

(21) Appl. No.: 17/282,025

(22) PCT Filed: Dec. 29, 2020

(86) PCT No.: PCT/SE2020/051264
§ 371 (c)(1),
(2) Date: Apr. 1, 2021

(87) PCT Pub. No.: WO2021/262060
PCT Pub. Date: Dec. 30, 2021

(65) Prior Publication Data
US 2023/0122212 A1  Apr. 20, 2023

(30) Foreign Application Priority Data
Jun. 26, 2020 (SE) .................................... 2050772-9

(51) Int. Cl.
*A23L 3/28* (2006.01)
*A47F 10/06* (2006.01)
(52) U.S. Cl.
CPC ................ *A23L 3/28* (2013.01); *A47F 10/06* (2013.01); *A47F 2010/065* (2013.01)
(58) Field of Classification Search
CPC ... A47F 10/06; F47F 2010/065; F47F 3/0478; A23L 3/28
(Continued)

(56) References Cited
U.S. PATENT DOCUMENTS 10,499,752 B2 * 12/2019 Palmnäs .................. A47F 3/04
2014/0097355 A1   4/2014 Stolle
(Continued)

FOREIGN PATENT DOCUMENTS

EP  1382277  1/2004
KR  101963319  7/2019

OTHER PUBLICATIONS

International Search Report issued in PCT/SE2020/051264, dated May 2, 2021, pp. 1-6.
(Continued)

*Primary Examiner* — Phuong T Nguyen
(74) *Attorney, Agent, or Firm* — Jeffrey S. Melcher; Melcher Patent Law PLLC

(57) ABSTRACT

A food bar arrangement (100) with product holding elements (103A,103B) holding fresh food products, an openable covering arrangement (110) including at least one covering element (10A, 10B) transferable between a closed and an open position, covering element sensing means (30A, 30B) registering an activation or a movement of the covering element (10A,10B) towards an open position or vice versa, a disinfection arrangement including a plurality of UV-C sources (52) in activated state exposing the food products to UV-C light at a wavelength appropriate for inactivation of pathogens, and a disinfection control system communicating with the covering element sensing means (30A,30B) and an UV-C source activating/deactivating arrangement (40) controlling the disinfection arrangement, and some of the UV-C sources are deactivated when a covering element is opened or moved towards an open position.

21 Claims, 11 Drawing Sheets

(58) Field of Classification Search
USPC .................................. 99/451, 450; 250/492.1
See application file for complete search history.

(56) References Cited

U.S. PATENT DOCUMENTS

| | | | |
|---|---|---|---|
| 2015/0069270 A1* | 3/2015 | Shur | ..................... F25D 17/042 250/492.1 |
| 2016/0058020 A1 | 3/2016 | Shur | |
| 2016/0203698 A1 | 7/2016 | Steinbok | |
| 2018/0103778 A1 | 4/2018 | Olovsson | |

OTHER PUBLICATIONS

Written Opinion issued in PCT/SE2020/051264, dated May 2, 2021, pp. 1-4.
Final Notice and Swedish Search Report issued in corresponding SE 2050772-9 dated Nov. 17, 2020, pp. 1-6.

* cited by examiner

FOOD BAR ARRANGEMENT WITH A FOOD SAFETY ARRANGEMENT AND A FOOD BAR ARRANGEMENT ASSEMBLY

TECHNICAL FIELD

The present invention relates to a food bar arrangement having a real-time disinfection arrangement using UV-light to disinfect pathogens when the food tray covers are in a closed position. The invention also relates to an assembly of the food bar arrangements.

BACKGROUND

Fresh food, salads, fruit, vegetables, but also cooked, prepared food and healthy food is today often offered from a food bar, or a salad bar, where the customer can pick and compose a meal from a number of different products e.g. kept in canteens or pans. Such, and other open food displays, are an attractive way to offer fresh food to consumers in retail stores, restaurants and other areas.

The food products will remain for some time in the food bar and have to be kept under such conditions, and at such a temperature, that they be kept fresh, appetizing and are not ruined or deteriorated in any way. Food bars or open food displays may be accessed by several persons and food safety is an extremely important issue. Foodborne illnesses constitute a serious problem and it is well known that bacteria, fungi, viruses and other pathogens can survive, and bacteria, fungi etc. can replicate and grow on food under certain conditions. Although viruses cannot multiply or propagate outside specific host cells, for example surfaces may be contaminated with viruses through droplets generated by an infected person sneezing or coughing on the surface of the food bar or on the food, or through the settling of air borne viral particles. The viruses might then survive until another appropriate host is encountered, and a surface may so serve as a source of viral diseases if e.g. other persons touch the contaminated surface or object and touch their mouth, nose or eyes, a so called smear infection, or if a food product contaminated with a virus is brought in contact with the mucous membranes of the mouth, throat or eyes.

So far, for food bars and open food displays, it has been mainly been focused on controlling the accuracy of storing temperatures, cooling temperatures, fans and the operational status of other parameters, carefully controlling that shelf times are not overrun, transporting food products only with high hygienic standards, e.g. using one way canteens or pans, and regularly cleaning and surveilling the food bars etc.

Food safety has gained extremely in importance, not least with the SARS-CoV-2 outbreak. For example, initial laboratory tests by an American working group for the new type of coronavirus SARS-CoV-2 have shown that it can remain infectious for up to 3 hours as an aerosol, up to 4 hours on copper surfaces, up to 24 hours on cardboard and up to 2-3 days on stainless steel and plastic following heavy contamination, "Aerosol and Surface Stability of SARS-CoV-2 as Compared with SARS-CoV-1", New England Journal of Medicine 2020; 382: pp. 1564-1567.

Therefore it has been realized that additional food safety measures are needed. Although it might be possible to further increase the hygienic standards of food bars and open food displays of the food to some extent, it is still a challenge to increase food safety considering that, even if the growth of bacteria is prevented, certain viruses might still survive. Thus, the until now implemented measures consisting in keeping the food products at an appropriate temperature, controlling the flow of air such that the amount of air directed onto the food products is kept low enough, or even using filtered air, are not sufficient since it has been realized that, in addition to the surfaces of the food bar, also the food products, and also any serving utensils, that may be used by several persons serving themselves from the food products, may actually act as an intermediary for surviving viruses, and an additional complicating factor is that food bars generally are accessed frequently, every accessing end user or staffs person constituting a plausible risk.

Different viruses, bacteria and other pathogens have different sensitivities to disinfectant measures. It has for long been known that viruses and bacteria are sensitive to heat and UV-C light and Ultraviolet Germicidal Irradiation (UVGI) is recognized as a method for inactivating microorganisms, Tseng et al: Inactivation of viruses on surfaces by Ultraviolet Germicidal Irradiation, Journal of Occupational and Environmental Hygiene, 4: pp. 400-405 (June 2007).

Although there are several known disinfection methods including exposure to heat, pressure, chemical disinfection, exposure to UV-C light, it is a problem that for food, chemical disinfection is not relevant due to health hazards, and also heat poses a problem for food that should be kept fresh, cold or refrigerated. UV-C disinfection has the advantage that it can be applied when heat application is not possible, for example for frozen products and surfaces of equipment under strict surveillance by staff in an UV chamber or similar, but since UV-C light exposure might be associated with adverse health effects such as erythema of the skin humans and animals should be removed from the area when UVGI is applied.

Thus, all known methods suffer from disadvantages and, and even if a food bar itself is disinfected, the food products placed therein strict hygienically controlled and all operational parameters and freshness being carefully monitored, relevant measures being taken for prevention of bacterial growth etc., as soon as it will be in operation and open for customer access, there may a risk of contamination e.g. with viruses that can survive, not only on the food bar itself, but eventually also on the food products, until a new host is available. It is associated with several problems and difficulties to further increase the food safety as far as food bars and open food displays are concerned, not least due to the frequent risk of contamination due to several individuals accessing it, the requirements as to a controlled, low, temperature, the sensitivity and fragility of several food products, but also due to the realization that not only the food bar and the serving utensils would need a frequent disinfection, but also the surfaces of food products might potentially be contaminated with viruses that may survive long enough to allow spreading.

SUMMARY

It is therefore an object of the present invention to provide a food bar arrangement as initially referred to, through which one or more of the above mentioned problems can be solved.

It is a particular object to enhance food safety for food bars and open food displays, and particularly to provide a food bar arrangement with a reduced risk for acting as an intermediate in the spread of viruses or bacteria or other pathogens.

A most particular object is to provide a food bar arrangement through which pathogens having reached the food bar can be inactivated at least to a certain predetermined level deemed as acceptable.

A particular object is to provide a food bar arrangement thorough which also the risk of pathogens having reached the food products can be reduced and the pathogens inactivated at least to a certain extent, at least for certain pathogens.

It is also an object of the invention to provide a food bar arrangement allowing controlling food safety, in particular, but not exclusively, food products served in loose weight or loose, improving measures regarding pathogens.

It is a particular object to provide a food bar arrangement wherein monitoring and controlling of disinfection measures can be effected substantially in real-time.

It is also an object of the invention to provide a food bar arrangement with a monitoring and controlling system through which information about disinfection measures, conditions of use of the food bar easily can be provided to staff, and particularly also to suppliers and/or the service provider, e.g. Picadeli™.

Still further it is a particular object to provide a food bar arrangement enabling offering food products, in particular offered in loose weight or loose, from which an end user can pick and compose a meal using serving utensils, such as spoons, tongs etc., while meeting high food safety requirements and with a reduced risk of surviving infectious pathogens.

Most particularly it is an object to provide a food bar arrangement enabling offering of food products while increasing food safety through reducing the risk of spread of surviving pathogens, which also is easy to use for the food bar service staff, which is reliable and fulfils high safety standards, both as far as food safety is concerned, food quality in general and end user access safety.

It is also an object to provide a food bar arrangement providing a high food safety without affecting the food products, also independently of their state, i.e. if refrigerated, frozen or warm, which also is safe, fail proof and which poses no risks, neither for staff nor for end users, and which in addition is easy to install.

Another object is to propose a solution through which the shelf life of food products offered in a food bar can be extended while reducing waste of food products which might have to be discarded due the risk of pathogens eventually having reached the food product surfaces staying viable, grow or remain infectious.

A most particular object is to provide a food bar arrangement through which the risk of spreading of coronavirus, most particularly SARS-CoV-2, that eventually might reach the food bar arrangement and remain infectious for some time, e.g. through a smear infection, can be reduced.

Therefore a food bar arrangement as initially referred to is provided which has the characterizing features of claim 1.

Therefore also an assembly of food bar arrangements s initially referred to having the features of the characterizing part of claim 23.

Advantageous embodiments are given by the respective dependent claims.

BRIEF DESCRIPTION OF THE DRAWINGS

The invention will in the following be further described, in a non-limiting manner, and with reference to the accompanying drawings, in which.

DETAILED DESCRIPTION

Figure 1:
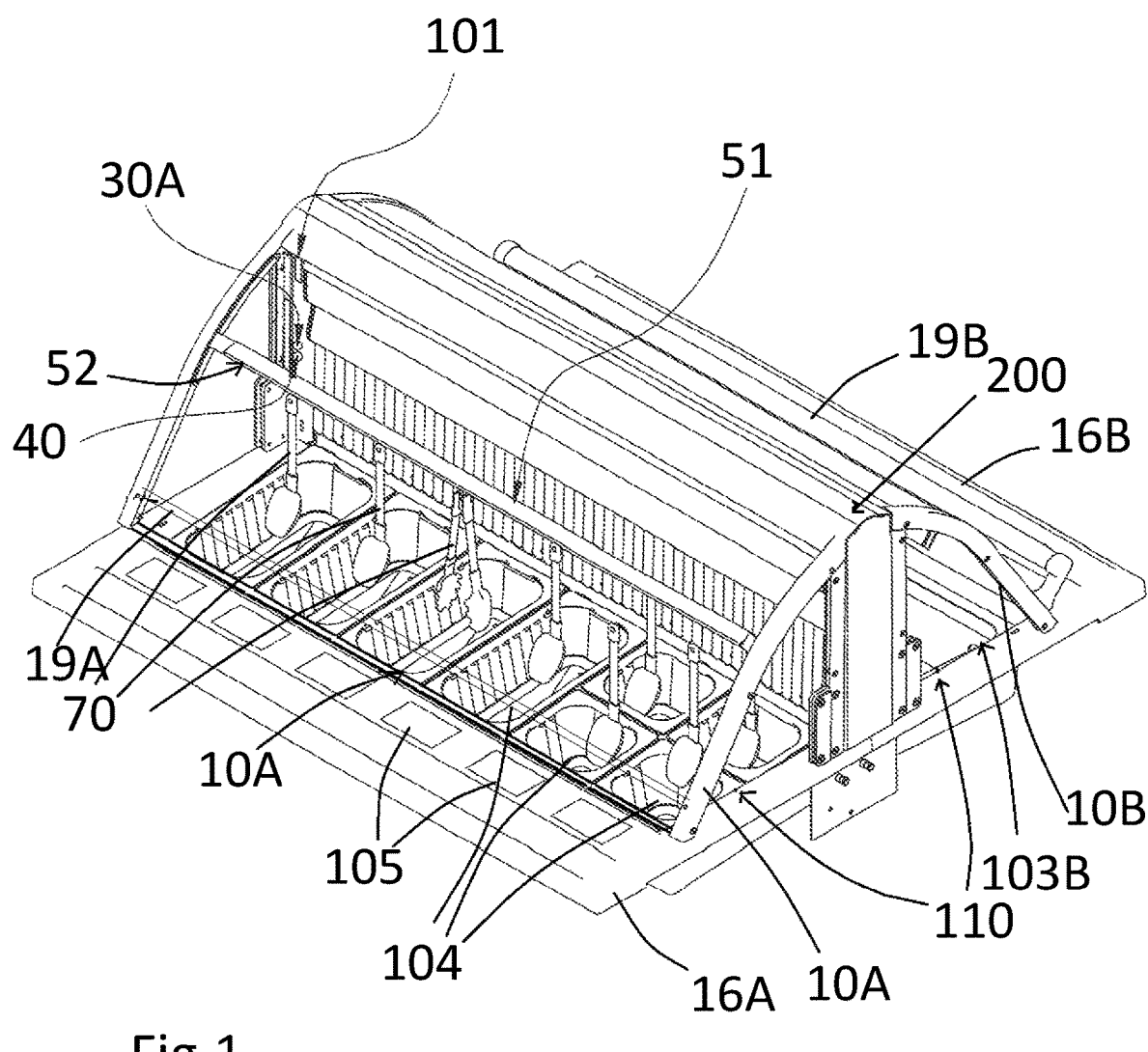
FIG. 1 is a schematic overview in perspective of an exemplary food bar arrangement with a disinfection arrangement according to one embodiment of the invention.

FIG. 1 shows an exemplary food bar arrangement 100 with to disinfection arrangement according to a first embodiment of the present invention. The food bar arrangement 100 in this particular case, to which the inventive concept by means is not limited, comprises an openable/closable covering arrangement 110 here comprising two separately openable/closable covering elements 10A,10B adapted to cover food products, e.g. in loose weight, loose products or apportioned, provided in canteens or pans 104 arranged in a holding arrangement, here with two separate holding elements 103A,103B such that there is one covering element for one holding element, tray slides 16A,16B (not of importance for the functioning of the inventive concept), here with digital displaying means or labels 805 which also not are of relevance for the functioning of the present invention. The food bar arrangement may e.g. also comprise a cabinet 300 for holding food products e.g. in a refrigerated or frozen state (see FIG. 2). The covering arrangement 110 as shown in FIG. 1, may be as described more thoroughly in WO2015/183156 filed by the same Applicant, and which herewith is incorporated herein by reference. Other openable/closable covering arrangements may also be used, as well as other food bar arrangements in general, for example with covering elements hinged at rear portions and openable through a rotational or pivoting movement.

A covering arrangement 110 does not have to comprise two covering elements for a dual sided food bar, but there may be one single covering element adapted and shaped for a dual-sided food bar, or the bar may be a single-sided food bar with one or more covering elements on just one side, or a food bar with more sides etc. A number of aligned food bar arrangements or food bar units comprising functional product stations may be arranged to form an assembly of food bar arrangements, or a food bar with several adjacent, separate, covering arrangements, each with one or more covering elements, may be provided.

Food products, e.g. loose weight food products or loose products, are held in the holding arrangement holding elements 103A,103B e.g. in a plurality of, particularly disposable one-way pans 104. (Food products may also be held in other manners, in loose weight or loose, not pre-packed end user portions, apportioned or not, in reusable containers etc., on plates or bowls from which an end user is offered to take a desired portion by means of a spoon, cutting a piece etc., or it may be a soup from which an end user or staff can take a portion). The food bar arrangement 100 here further comprises a cooling system comprising a cooling arrangement 200 for cooling the food products in order to keep them at a desired temperature, e.g. above 0° but below 8° C., or within any other specified temperature interval. The cooling arrangement 200 is in the shown embodiment disposed at respective rear sides of, and between, the covering elements 10A,10B. The cooling system may be adapted to cool, and allow for separately controlling the cooling of one or more different climate zones which however is not important for the functioning of the inventive concept but merely relates to a specific implementation. It should be clear that the inventive concept is applicable irrespectively of whether a cooling system with a cooling arrangement is used or not. An example of a cooling arrangement and a cooling system respectively is shown in WO2015/187075 and WO2015/183157 filed by the same applicant and the contents of which herewith are incorporated herein by reference.

The covering elements 10A,10B are adapted to cover the food products (e.g. in the pans 104) from above so that the food products are protected in time periods between customers accessing the food bar arrangement and possibly might contaminate the food products, and the food bar, with pathogens. The covering elements 10A,10B can be transferred from an open position or an open state, in which access to the food products is provided, to a closed state in which access is prevented and the food products protected from pathogens eventually reaching the surfaces of the food bar, the food products and any serving utensils 70 through user access. Pathogens may also reach the food products or other surfaces in the food bar arrangement through circulating air used to cool the food products.

In the shown embodiment, in order to transfer a covering element 10A,10B from a closed to an open position, it is moved in a vertical direction between a first, lower, position, the closed position, (covering elements 10A,10B in FIG. 1), in which it substantially is in contact with an upper side of a holding arrangement 103A,103B, preventing access to the food products, and a second, upper position (covering element 10A in FIG. 2) in which access is provided to the food products in the holding arrangement. The covering elements 10A,10B are movable between said first, closed, and said second, open, positions e.g. by means of the covering arrangement being connected to a mounting (and driving) structure comprising guide rails in which e.g. slides or pulleys (not shown) mounted on the covering elements can run. Such opening and closing movements can be achieved in different manners and the invention is by no means limited to any mounting and driving structure. An optional exemplary mounting structure may be provided with vertically disposed guide rails arranged in parallel for cooperation with the respective rear outer edges of a single cover element, or it may be a dual mounting structure adapted to receive two covering elements 10A,10B as in FIG. 1, which independently can slide up and down by means of respective guiding rails. It should however be clear that the transfer between an open, upper, position and a closed, lower, position can be achieved in many different ways. If the covering elements were instead hinged or pivotally arranged at e.g. a rear position, covering element sensing means, e.g. position or motion detection means could for example be arranged to detect opening angle.

Second or fixed side sections or side walls $13A_1,13A_2$ (see FIG. 2; only shown for an open position of a covering element) may in advantageous embodiments be provided which have substantially the same, or a similar, shape as first side sections $12A_1,12A_2$ of the covering elements (only shown on one side of the food bar arrangement) but with slightly reduced dimensions so as to admit the first side sections $12A_1,12B_2$ to, in a closed position of the covering elements, to be disposed on the outer sides of said second side sections, at a slight or minor distance therefrom, and in such a manner that said second side sections will be located closest to the food holding elements 103A,103B. Said second or fixed side sections, in addition to contribute in maintaining an even temperature distribution by preventing prevent cool air from escaping from the region above the food products when a covering element is in an open position and to prevent warm air from entering, also contribute in reducing the risk of pathogens entering from the sides.

Each covering element 10A,10B in this embodiment comprises a front section 11A,11B exhibiting a vaulted shape, a rear section (not shown) and two side sections $12A_1,12B_1$ (see FIG. 2 which illustrates the side sections on one side of the food bar arrangement) interconnecting respective opposite outer edges of the respective front and rear sections in such a manner that two covering hoods are formed with one another facing, and in parallel to one another extending, substantially plane, rear sections, which in a mounted state of the covering arrangement are disposed in a vertical manner, forming covering element 10A,10B rear walls. The edges of the first side sections $12A_1,12B_1$ adjacent the rear sections are vertically disposed (in a mounted state) whereas the edges connecting to the front sections taper upwardly to a location where front and rear section upper edges meet or are joined by means of a frame structure. Said rear sections are in an advantageous embodiment disposed at a distance from one another, leaving space for the cooling arrangement 200 between them. The upper end of the cooling arrangement 200 may be contiguous with the upper end of the covering elements 10A,10B in their closed positions, may be disposed below the position assumed by the upper end or edge of the/each covering element in its closed position, or protrude above the covering elements in a closed position, although its active portion, as far as its cooling functionality is concerned, preferably terminates at the upper end or edge of the covering elements 10A,10B, which however is not of importance for the functioning of the inventive concept.

Each covering element 10A,10B is here equipped with an actuating element 19A,19B (only one shown in FIG. 1; cf.

Figure 2:
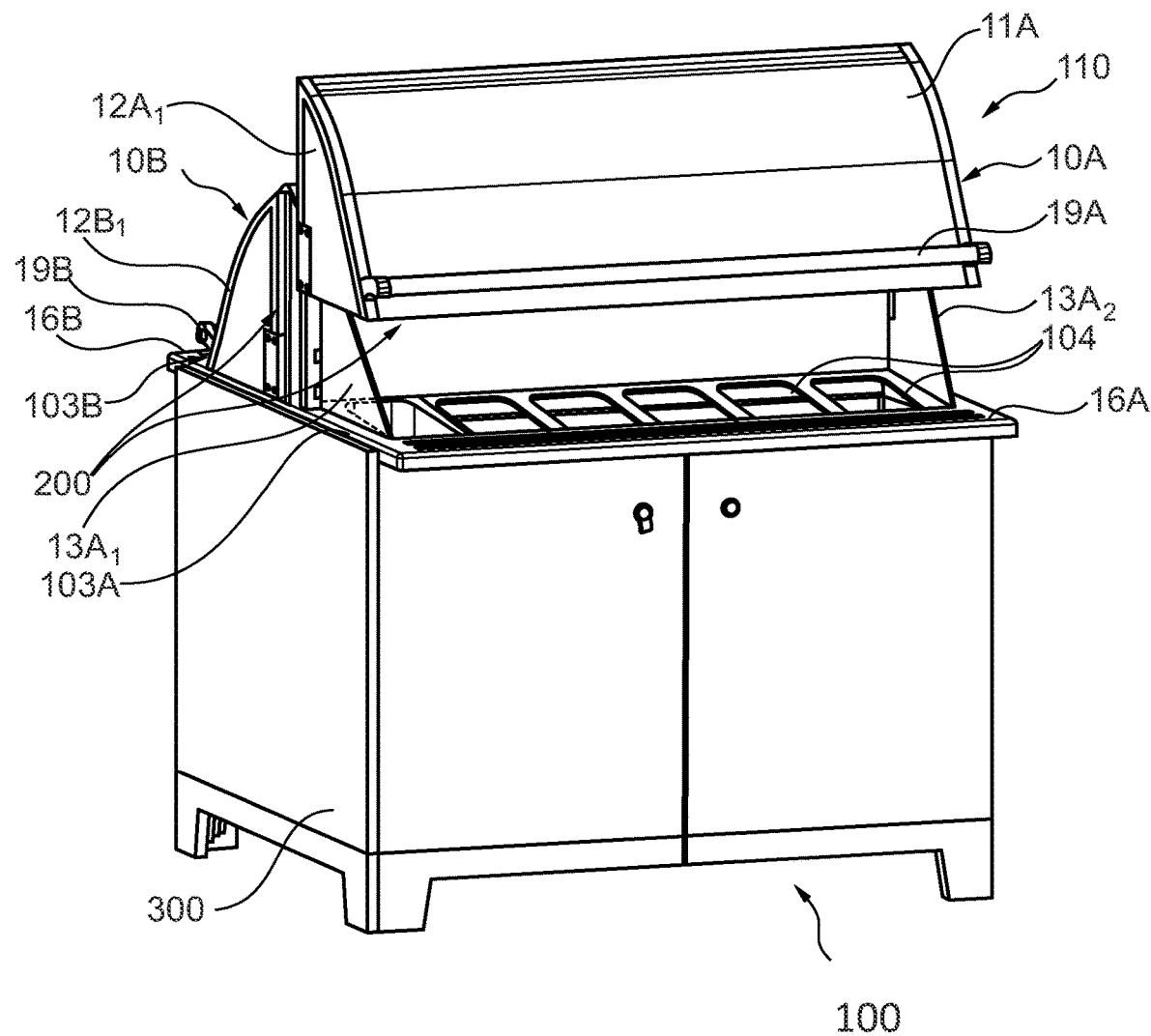
FIG. 2 is a schematic external view in perspective of one implementation of a food bar arrangement as in FIG. 1 illustrating one covering element in a closed position and another covering element in an open position.

FIG. 2), e.g. a gripping element or a handle by means of which a customer, accessing the food products can bring the covering arrangement 10A,10B from the closed position to the open position and vice versa. In the shown embodiments the actuating elements 19A,19B extend along, adjacent, the lower ends of the covering element front sections 11A,11B. The actuating elements may of course be of any other form or shape, disposed in any different manner, the purpose being to facilitate opening/closing of the covering arrangement. In one embodiment they are provided with covering element sensing means connected to a UV-C activating/deactivating switch or control system for providing a signal indicating that a covering element will be opened/closed as will be discussed below for other positions of the sensing means.

The food bar arrangement comprises a disinfection arrangement which here comprise UV-C source holding elements 51,51, each with a number of UV-C sources 52, e.g. an UV-C-LED system comprising an array of UV-C LED sources or a number of UV-C chips, which here are arranged on the inner side of each covering element 10A, 10B. The UV-C sources 52 are arranged to, in an activated state, expose the food products kept in the food bar holding elements 103A,103B, and the surfaces of the food bar holding elements, as well as any optional serving utensils 70 arranged below the covering elements 10A,10B, to UV-C light at a wavelength appropriate for inactivation of pathogens. The wavelength of the UV-light emitted by the UV-sources is particularly between 200-280 nm, preferably between 250-280 nm, which is the wavelength region which is most efficiently absorbed by the DNA/RNA of pathogenic microorganisms such as bacteria and viruses or other pathogens, enabling inactivation or survival thereof if exposed to a sufficient fluence, or UV-C dose, particularly between 260 and 280 nm.

In one embodiment, not shown, one or more UV-C sources may also be mounted on the inner sides of the fixed side walls $13A_1,13A_2$. Also such UV-C sources will have to be connected to the covering element motion or position sensing means 30A,30B, or to separate covering element motion or position sensing means (not shown) to prevent that a user accessing the food products in an open state of the covering element, will not be exposed to UV-C light. If the food bar arrangement does not comprise any second or fixed side sections, UV-C sources may be arranged on the inner sides of the side sections of the cover elements $12A_1,12B_1$.

The covering elements 10A,10B here comprise rear sections located adjacent to a cooling element of the cooling arrangement 200, which are movable with respect thereto such that when a covering element is in an open position, the rear section is moved upwards, such that a larger area of the cooling element will be exposed to cooling for increased cooling of the food products, and through the optional second side sections, the covering arrangement contributes to keeping an even, controlled, temperature distribution in the food bar, which also assists in limiting the growth and/or survival of certain pathogens. In a particular implementation (not shown) UV-C sources may in addition also be provided at the upper, inner side of said rear sections; mounted such as to direct the UV-C light onto the food products, and/or onto the rear side of the serving utensils 70. Also such optional UV-C sources must be connected to the, or a separate, covering element motion or position sensing means in order to assure that they are inactivated when the covering element where they are located is opened.

As referred to above, different types of covering arrangements can be used. A covering arrangement may have different form and shape, it may be split into different sections; one for each a holding arrangement, or one section for two or more holding arrangements in a row. It may comprise a common mounting structure allowing separate opening and closing of two or more covering elements, or with separate mounting structures for each a covering element, the latter allowing an even more flexible assembly of independent modular single-sided food bar arrangements.

Particularly the UV-sources are arranged and controlled to provide at least a 2-log inactivation of pathogenic microorganisms. Preferably the UV-sources are so arranged and have such a fluence or fluence rate and are activated for such time periods that a 3-log inactivation of at least specific pathogens, such as e.g. SARS CoV-2 or any other selected pathogen to be inactivated to a certain extent. In some embodiments, or at some events, e.g. through deep cleaning events, the UV-sources are so arranged, have such a fluence or fluence rate, and are activated for such a time period that a 4-log inactivation is achieved.

In particular embodiments the UV-sources are so arranged and have such a power that a fluence of about 15-24 $mJ/cm^2$ is achieved, most particularly about 18 $mJ/cm^2$ substantially throughout the whole surface to be disinfected within a predetermined time period, e.g. 60 minutes, or a shorter or a longer time period, i.e. all the food products and areas which a user may get into contact with adjacent the food products, and any food serving utensils located in the food bar.

A fluence of about 15-24 $mJ/cm^2$ is in several embodiments sufficient since the UV-C sources are activated preferably each time the covering elements are closed, and activation is controlled and monitored.

It should be clear that the figures (fluence as well as fluence rate) are merely given for exemplifying, and by no means limitative purposes, and can be varied depending on inactivation requirements, pathogens etc.

Preferably the arrangement, output powers and activation times of the UV-C sources are such as to assure a viral reduction (e.g. of SARS CoV-2) of at least 90%, or preferably of at least about 99%.

In Tseng et al: Inactivation of viruses on surfaces by Ultraviolet Germicidal Irradiation, Journal of Occupational and Environmental Hygiene, 4: pp. 400-405 (June 2007), disinfection of viruses is discussed and it was found that viruses with a single-stranded nucleic acid, ssRNA, like SARS CoV-2 (Features, Evaluation and Treatment Coronavirus (COVID-19), M. Cascella et. al, Last update Apr. 6, 2020, are more sensitive to UV-C irradiation than double stringed RNA and DNA viruses are In Technical paper 2020 COVID-19 Coronavirus Ultraviolet Susceptibility, it is found that the UV-C dose needed for Coronvirus inactivation to 90%, varies from 0.7-24.1 $mJ/cm^2$ with a mean value of 6.7 $mJ/cm^2$, https://www.researchgate.net/publication/339887436_2020_COVID-10_Coronavirus_Ultraviolet_Susceptibility.

It has also been demonstrated that a higher UV-C dose might be required to inactivate ssRNA viruses at a higher relative humidity: https://www.ncbi.nlm.nih.gov/pubmed/17474029.

Therefore the food bar arrangement in some embodiments comprises humidity sensors (not shown) for adapting a required UV-C dose, or fluence, also with due consideration to the relative humidity in the food bar arrangement.

The food bar arrangement 100 according to the present invention comprises or is connected 101 to a disinfection control system, e.g. a local and/or a central server, for controlling the UV-C light exposure and activation of UV-C sources. Said disinfection control system comprises or communicates with an activating/deactivating arrangement 40 comprising means for activating/deactivating the UV-C sources exposing food products covered by a covering element separately, in groups or all at the same time. For activation and deactivation (switch on/switch off) of one or more of the UV-C sources 52 associated with a covering element 10A,10B, said activation/deactivation arrangement 40 e.g. comprises one or more safety circuit breakers which may be co-located with covering element motion or position sensing means 30A,30B arranged for detecting the opening state (if a covering element is detected to be moved or intended to be moved towards an open position), of the covering element 10A,10B or separately arranged. Thus, when it is detected that a covering element 10A,10B is to be opened, or an indication or similar on the covering element 10A,110B passes a certain predetermined position, a signal is provided to the activation/deactivation arrangement 40, and the UV-C sources 52 are deactivated or switched off in that part allowing a customer or a staffs person to safely access the food bar or the food products without being exposed to UV-C-light. Thus, deactivation of the UV-C sources is controlled at least depending on opening state of the covering elements 10A,10B. For reasons of redundancy and safety, additional covering element sensing means (not shown) may be provided e.g. at different locations. Covering element sensing means may in one embodiment be touchless.

Correspondingly also the UV-C sources may be activated when a covering element 10A,10B is detected to assume a closed position.

The disinfection control system further preferably comprises an UV-C light exposure control system, which may form part of or be incorporated in an existing monitoring and control system of the food bar arrangement as will be further discussed below in particular with reference to FIG. 12, and e.g. as described in WO2016/175696, filed by the same Applicant, and which herewith is incorporated herein by reference, or it may comprise a dedicated, stand-alone control system, e.g. communicating with any optional or existing control system, or comprise a local control system, or a local control system additionally in communication with a remote control system.

The UV-C light exposure control system in one embodiment comprises or communicates with a time control unit adapted to measure the time the UV-C sources 52 are activated and/or deactivated, for individual UV-C sources or for fixed or variable groups of UV-C sources covered by a same covering element, and is further arranged to control UV-C source illumination intensity by controlling the number of activated UV-C sources, which of a number of UV-C sources that are to be activated, and activation period of one or more of the UV-C sources depending thereon. In some embodiments a current UV-C dose or fluence is calculated or estimated, accounting for new possible contamination events during deactivation due to user access, i.e. upon detection of a covering element being opened, the lengths of deactivation periods, and/or other relevant parameters such as e.g. number of accesses during a given time period etc. which requires a recalculation of the required fluence, e.g. the number of and which UV-C sources to be switched on, e.g. the illumination directions if variable, the positions of UV-C sources to be switched on etc. This may be handled by a computer of a local or of a remote control system as will be further discussed below, and forming part of the UV-C light exposure control system, running a computer program comprising an algorithm for calculating an updated needed or required UV-C fluence, or fluence rate (e.g. depending on relevant pathogens for which a required fluence may be pre-set), continuously or at a predetermined frequency and/or at occurring of certain events such as reception of a signal from a covering element sensing means, based on input covering element sensing means 30A,30B, one or more of temperature, air flow and humidity sensors in the regarding the holding arrangement section which is covered by a covering element. Based on said calculated up-to-date required fluence or fluence rate, by means of the local and/or central control system, UV-C sources at specific locations, number of UV-sources, activation thereof and their currently required activation time etc. are controlled, hence allowing control substantially in real time of the activation/deactivation of UV-C sources, optionally the direction of illumination, the number of activated UV-C sources, which specific UV-C sources or groups of UV-C sources.

The UV-C sources are so arranged that the whole surface of a food bar section covered by a covering element in a closed position is exposed to UV-C light, preferably such that the highest UV-C fluence is achieved for those areas or locations where the probability of pathogens being deposited is highest, i.e. where pathogens are most likely to be found, which is estimated to be the regions closest to an accessing end user, i.e. close to the front end of a holding element 103A,103B.

In one implementation a risk of contamination is calculated, to, depending on an updated risk, control the UV-C sources as described above if the risk is estimated to be too high or exceeds a predetermined risk value indicated as an acceptable, low, risk.

In some embodiments, a threshold value indicating an unacceptable risk may be set, e.g. in the local or central computing software, such that if the calculated risk exceeds said predetermined threshold value in a product holding arrangement, the corresponding covering element may be automatically blocked in a closed position.

In one implementation a risk is estimated though measuring time between opening of the food bar, and using information on the air flow in the food bar, calculate a potential exposure to pathogens.

In still other embodiments UV-C fluence or fluence rate sensing means 54 may be provided, and the control of the UV-C sources may be based on sensed UV-C fluence.

In particular embodiments the covering element sensing means 30A,30B, e.g. motion or position detection means, are arranged to provide a signal to the disinfection control system each time a covering element 10A,10B is detected to be opened and/or closed, or passes a predetermined position in one or the other direction. When it is detected that a covering element is opened, at least some of the UV-C sources are inactivated, whereas when it is closed, at least some of the UV-C sources are activated, or the fluence rate is increased as discussed above. In an advantageous implementation the disinfection control system computing means, at least upon reception of a signal from the covering element sensing means 30A,30B, recalculates a current required activation period required for reaching a predetermined UV-C source fluence and to, in dependence thereon, determines at least the length of the activation period for the UV-C sources, controls an UV-C source driver, may optionally also initiate blocking of a covering element 10A,10B in a closed position with activated UV-C sources for a time period until a required UV-C fluence has been reached.

The UV-C light exposure control system may alternatively comprise a time control unit comprising a timer for measuring the time elapsed since the last activation and/or deactivation of individual UV-sources 52 or of fixed or variable groups of UV-sources in a food bar holding section with a covering element, for, each time an opening and/or closing event is detected, calculating an updated time period during which the UV-sources needed, or just adding the time to a pre-calculated time, or resetting the timer, and to by means of the activation/deactivation means 40, activating at least some of the UV-sources 52.

In some advantageous embodiments the disinfection arrangement may comprise one or more lens elements (not shown) arranged for assisting in controlling, reducing or enhancing, the effective energy transfer from one or more UV-C sources, i.e. the irradiation onto, or energy concentration, on given surface areas. The lenses may e.g. comprise fused silica lenses.

In still other embodiments the disinfection arrangement may comprise UV-C light absorbing material e.g. plastic or any known appropriate non UV-C light transparent material arranged to prevent UV-C light from reaching predetermined specific areas or regions, and/or areas outside the food bar arrangement where free user/end user access is permitted.

The disinfection control system may further comprise or be connected to alarm means arranged to indicate non-achievement of a predetermined UV-C fluence or dose pre-set as a required fluence or for inactivation of at least a given pathogen, e.g. SARS-CoV-2; an alarm may made available to the local and/or central control system to advert the staff or the service provider, allowing measures to be taken, e.g. through via a local or remote user interface of the local or remote, central control system, or automatically via a programming step in an exposure control software program in computing unit 80,880,804 (see FIG. 10) controlling activation/deactivation of the UV-C sources, set duration of subsequent activation periods, e.g. through manual interaction via the local or remote user interface.

In one embodiment the fluence rate of the UV-C sources of the disinfection arrangement is about 0.08 W/m$^2$ (0.08 J/s·m$^2$, i.e. 8 µJ/s·cm$^2$) in a holding arrangement section covered by a covering element, which would mean that a 90% reduction in SARS-CoV-2 would be achieved in about 14.3 minutes. In other embodiments the UV-sources have a higher fluence rate, or are more densely positioned, and or there are more UV-C sources used, which means that a shorter activation time is needed in order to achieve e.g. a desired virus inactivation.

It should be clear that these figures merely are given for exemplifying reasons and a higher as well as lower inactivation of viruses might be at issue for inactivation, other viruses may be at issue, and it also depends on how time is available/acceptable for inactivation. It should be clear that other values are also possible, e.g. depending on pathogens at risk or a pre-set acceptable risk.

In advantageous embodiments the food bar arrangement may comprise indicating means for indicating when the disinfection arrangement is in an activated state, as an information or warning to customers and staff. It may be in the form of a display or similar, e.g. indicating UV-C on. Preferably the indicating means are connected to the activation/deactivation means 40 such that when the UV-C sources, locally for a food product holding element with a covering element, are in an activated state, or to be activated, the indication means are activated, or a lamp is switched on etc. Many different implementations are possible.

The front section 11A,11B of a covering element 10A, 10B is preferably made of a transparent material having such properties and/or thickness that it is not transparent to UV-C light of the used wavelength intensity, and in addition capable of withstanding exposure to UV-C light without being harmed or deteriorated, e.g. polymethylmethacrylate, 3-5 mm, particularly about 4 mm thickness. The side sections and the rear sections may according to different embodiments be made of the same material as the front section, if exposed to UV-C light, or otherwise of other appropriate materials.

Figure 10:
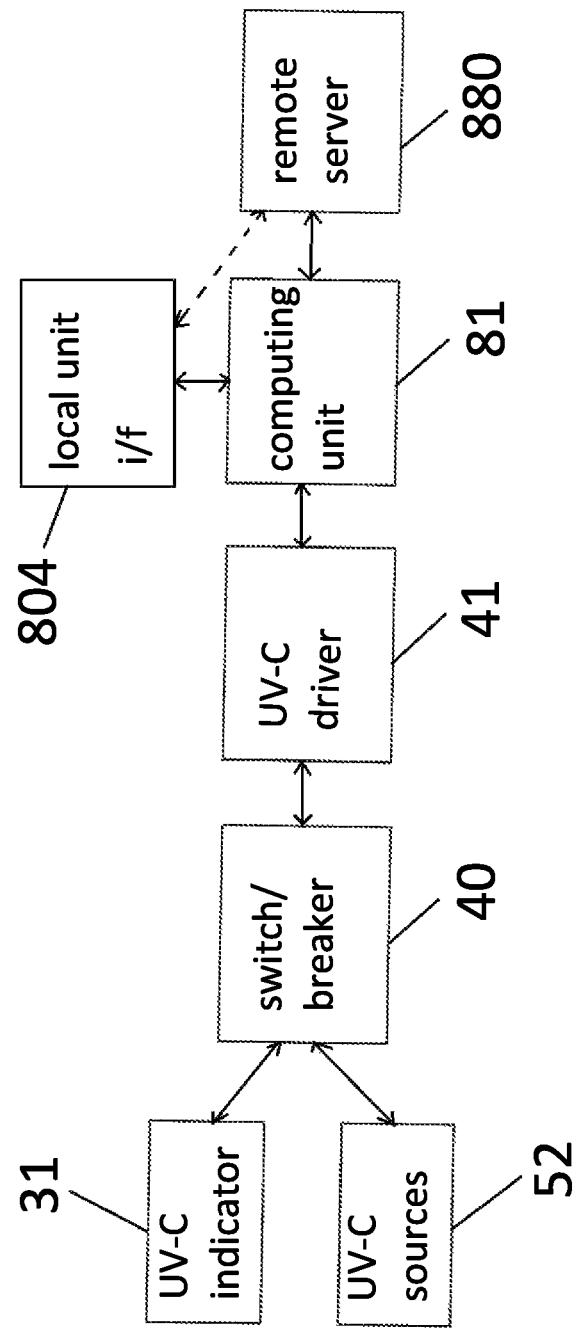
FIG. 10 is a schematic block diagram showing a system overview of a food bar disinfection arrangement and a disinfection control system according to the invention.

In advantageous embodiments the disinfection control system comprises a UV-C light exposure control system which comprises or is connected to a remote or central server 880 allowing remote monitoring and control of at least the UV-C source activation/deactivation as also discussed above; cf. FIG. 10. The disinfection control system also comprises a local control system with a local server and a local computing unit 80 and may in addition also comprise one or more portable or stationary hand units 804, which are connected to the local control system 80 and/or to the remote or central server 880, hence allowing local and/or central, remote monitoring and control of at least the UV-C sources, e.g. one or more of activation/deactivation, UV-C source intensity or fluence rate, selection of required UV-C source fluence or total illumination depending on pathogen, cover element blocking as discussed above.

In advantageous embodiments a desired UV-fluence can be set, e.g. in the local control system 80 an/or in the remote or central server 880, or even by the fixed or stationary local unit 804, e.g. depending on pathogen, and the computing arrangement of the local or central control system of the disinfection control system is programmed to perform a risk calculation of a potential exposure risk based on locally collected and received information regarding opening state of covering elements, duration of opening state, sensor information etc., for the control of the UV-C sources based on said information and calculations.

In the shown embodiment serving utensils 70 are arranged above the product holding elements 30A,30B, e.g. on hooks or similar. Since the customers (or in alternative embodiments staffs persons) use the serving utensils 70 for taking food products, served in loose weight or apportioned or in any other appropriate manner, it is important that also the serving utensils are disinfected, which is easily enabled through arranging them such that not only the food products but also the serving utensils are exposed to the UV-C light. It is also possible to arrange some UV-sources such that they are specifically directed towards the serving utensils 70.

FIG. 2 illustrates an exemplary food bar arrangement 100 substantially as in FIG. 1 but is shown merely for illustrative purposes illustrating covering element 10A is in an open state whereas covering element 10B is in a closed position preventing access and protecting the food products on one side of the food bar. Also the covering element side sections 13A$_1$,13A$_2$ as well as fixed side section 12A$_1$ are more clearly illustrated. In FIG. 2, the holding element 103A, 103B are adapted to receive one or more rows of pans 104, the cooling arrangement 200 protruding in a central portion of the bar arrangement to a height substantially in line with the upper edges of rear sections, or rear walls, of the covering elements 10A,10B when they are in a closed position.

Also an exemplary optional cabinet arrangement 300 is shown, which here is provided with doors and which may, in addition to a machine room comprise a refrigerating arrangement, forming one or more specific climate zones. The invention is not limited to any such cabinet, or a cabinet at all, nor to any different climate zones.

The air circulating above the food products may be filtered or not. Since the air generally is taken from the outside, it may also to some extent be contaminated, which is a reason for activating UV-C sources despite few or no accesses.

Figure 3:
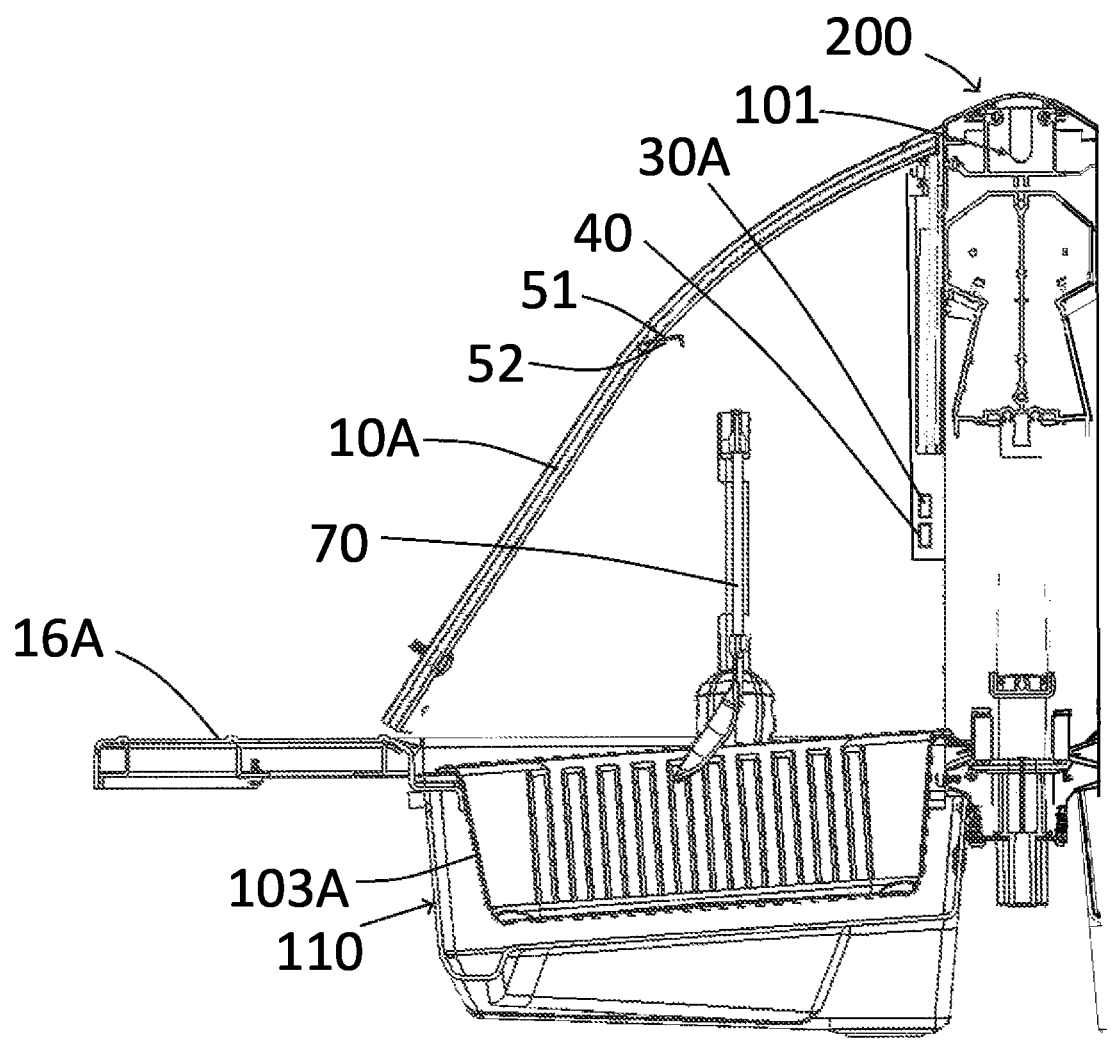
FIG. 3 is a cross-sectional view taken transversally through a product holding arrangement with a covering element of the food bar arrangement in FIG. 1.

FIG. 3 is a cross-sectional view taken through covering element 10A and part of the cooling arrangement 200 of the food bar arrangement 100 shown in FIG. 1. An UV-C source 52 is arranged at the inside of the covering element 10A on UV-C source holding element 51, about one third from its upper edge and directed such as to illuminate the food products in the holding arrangement 103A, or pans 104 therein, and also the serving utensils 70. In FIG. 3 the activation/deactivation arrangement 40 comprising a switch is located at the rear, e.g. at the mounting structure. The covering element sensing means 30A,30B, other sensors e.g. for sensing temperature, humidity, air flow etc. are via the connecting means 101 connected to the food bar arrangement local control system, comprising a computing unit, a local station server and a user interface, collecting local information from sensors, e.g. regarding temperature, humidity, activation/deactivation time periods, optionally covering element blocking, and allowing said control of the UV-C sources via the activation/deactivation means 40.

Figure 11:
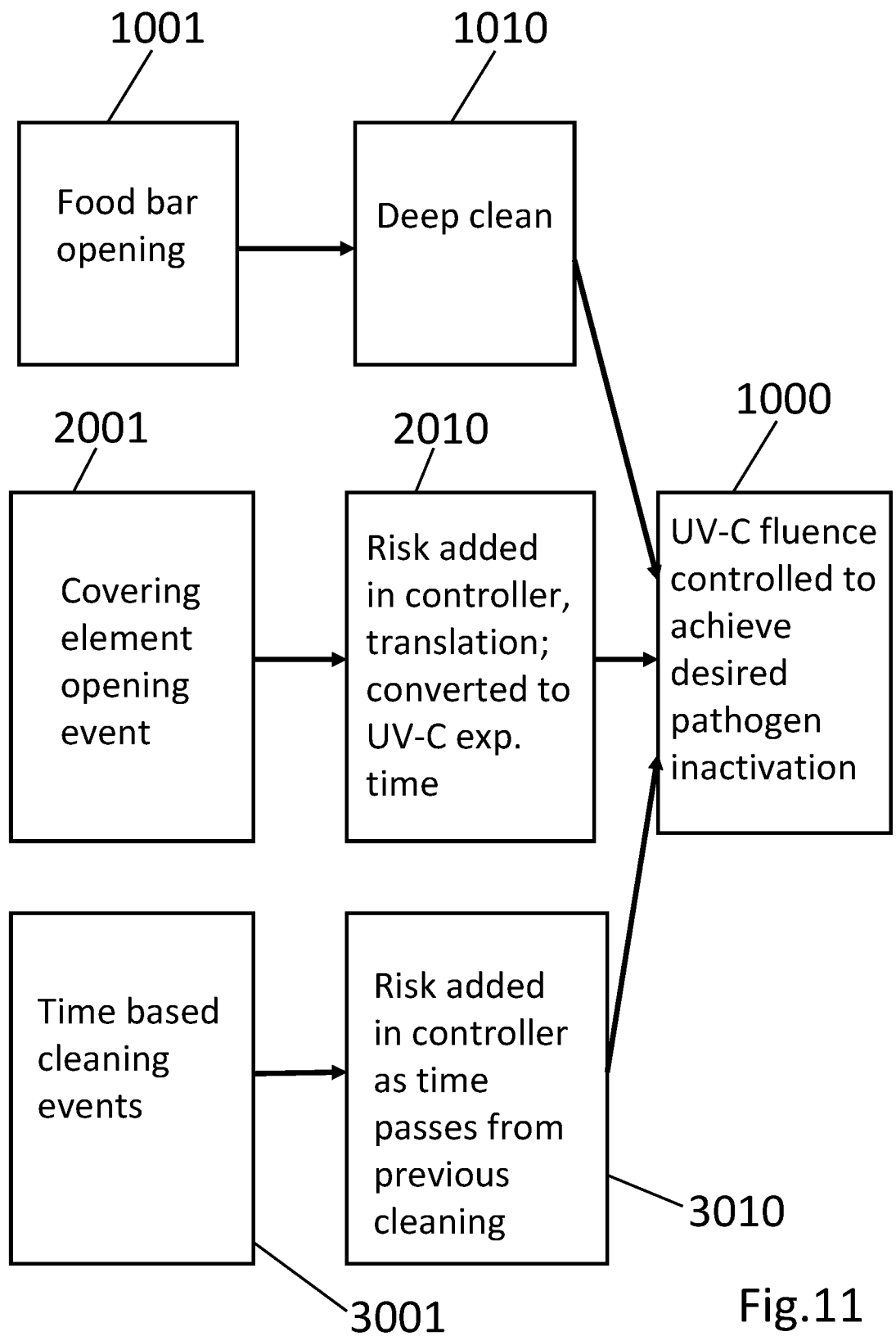
FIG. 11 is a very schematic overview of an example of UV-C operating logic according to the invention.

The local control station 80 is, or may be, connected to a remote or a central server 880, allowing remote control, and optionally to a fixed or portable local unit, e.g. a hand unit, 804 allowing local monitoring and control also via the fixed or portable unit (see also FIG. 11). The holding elements 103A,103B in the shown embodiment, to which the invention however by no means is limited, are disposed or held in an inclined position such that outer, upper, ends or side edges, of pans 104 (or different pan holding elements) placed therein (see FIG. 2) will be disposed at a lower level than opposing inner, upper ends. Bottom sections of the holding arrangement 103A,103B are e.g. disposed such that a distance is left between the bottom surface of the holding arrangement, forming a cold well, and the bottom portions of food pans in the holding elements, and particularly between a pan bottom section and a holding element, and a holding element and the holding arrangement also assisting in an even temperature distribution.

In other respects, elements having already been described with reference to FIGS. 1 and 2 will not be described in any detail. Also, elements not necessary for the functioning of the inventive concept are not discussed, such as the mounting structure and the cooling arrangement.

Figure 4:
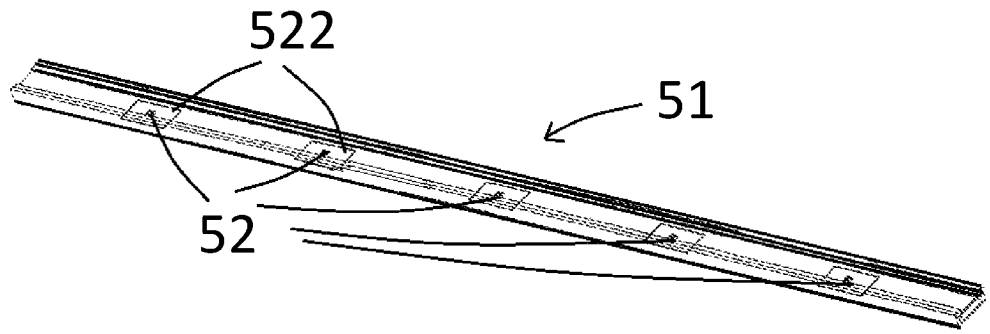
FIG. 4 is a schematic overview in perspective of an exemplary UV-C source holding element comprising a ledge.

FIG. 4 schematically illustrates an UV-C source holding element 51, e.g. a ledge, for holding a number of UV-C sources 52, here five UV-C LEDs. In other embodiments the UV-C sources may comprise UV-C chips based on a field emission techniques. Each UV-C LED 52 is here mounted on a customized circuit board 522. The total amount of power that it is needed depends on the surface area that is to be disinfected, i.e. on which pathogens of a given type, are to be inactivated, required or desired inactivation level (e.g. 2-, or 3-log inactivation, in some embodiments even lower temporarily for a short time period or under certain circumstances, or higher, e.g. 4-log inactivation), the distance from the surfaces to the sources, the power of UV-sources, the number of UV-sources, how much time that is available or acceptable for inactivation to a certain level. It might not be cost-efficient to add additional UV-sources, or use UV-sources with a higher power just to obtain a very slight increase in inactivation, and once an acceptable inactivation level is reached, additional costs are preferably balanced towards benefits.

The holding element 51 can be connected e.g. by screwing or by means of any other appropriate mounting element (not shown) onto the side walls of the covering element in any appropriate manner; or to any other element on which it is to be arranged; the mounting structure.

Figure 6:
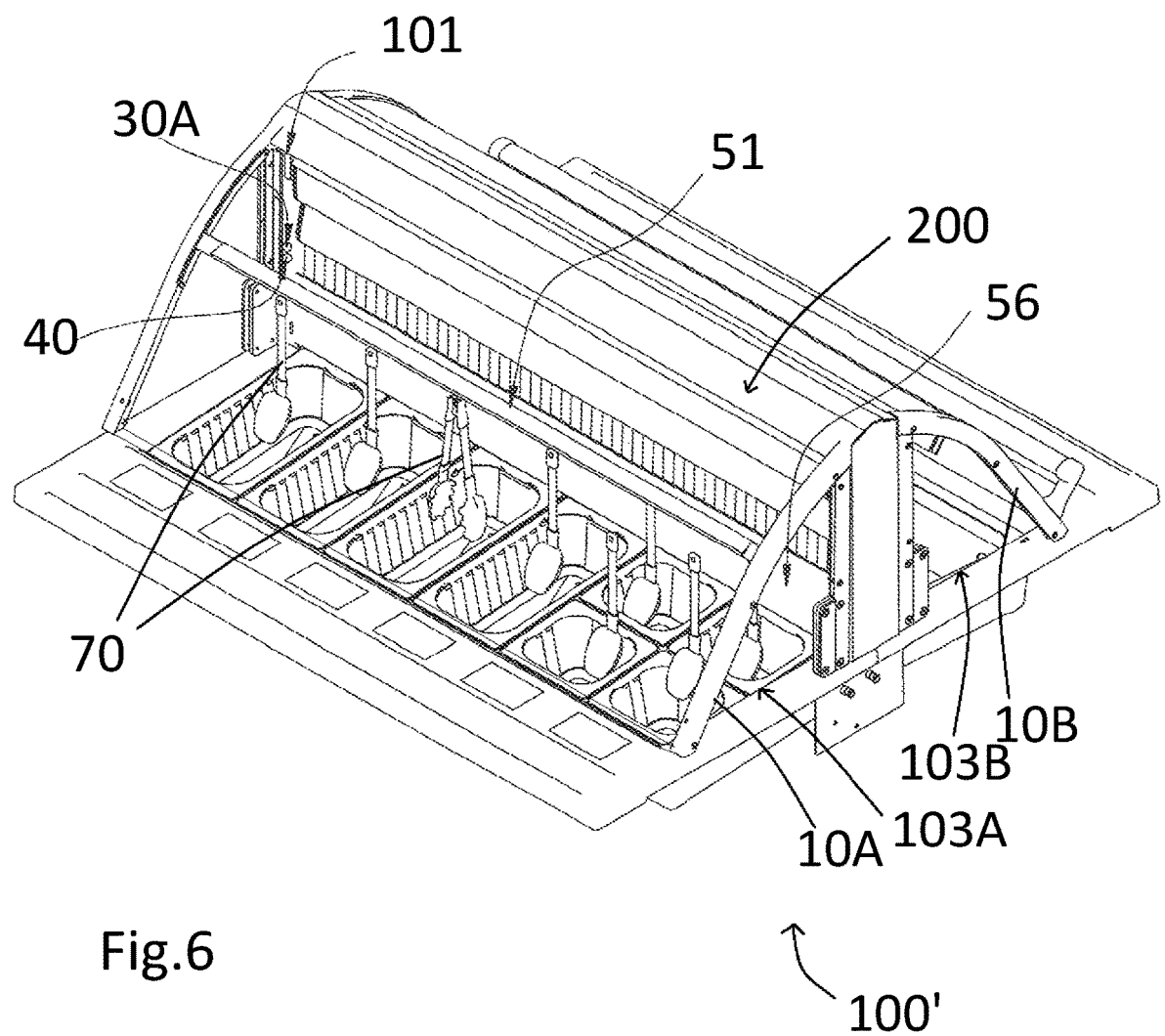
FIG. 6 is a schematic overview in perspective of a food bar arrangement according to a second embodiment similar to FIG. 1 and which further comprises an UV-C light reflecting arrangement.

In the shown particular embodiment, e.g. with a food bar arrangement comprising 6 product holding elements, five UV-C sources 52 comprising UV-C LEDs 520, e.g. 19 mW power, are provided on UV-C holding element 51 arranged at the front inner side of the covering element, e.g. as in FIG. 1 or FIG. 6. The UV-C sources may e.g. be arranged approximately at a distance between 23 and 29 cm from the food product upper surface, particularly about 27 cm, and 22 cm from the front of the food bar. The total surface to be covered is in a particular embodiment about 3200 $cm^2$. The UV-sources 52 are here arranged such that the distance from the outer side walls of the food bar, from the outer sides of the covering elements, to the closest UV-C sources approximately is between 68-78 mm, particularly about 73 mm. The other UV-C LEDs are then arranged equidistantly, e.g. such that there will be a distance of about 330-350 mm between each UV-C LED. It should be clear that this is merely an example. More or less UV-C sources can be used; they can also be arranged at equal or at varying distances from each other. The exposure time be reduced if the number of UV-C sources increase for the same power of each UV-C source.

According to another embodiment, also for a food bar arrangement comprising e.g. 6 product holding elements, as described above, instead e.g. ten UV-C sources 52 comprising UV-C LEDs 520 are provided on an UV-C source holding element 51 arranged at the front inner side of the covering element as above. The UV-C sources are arranged approximately equidistantly, and the outer edge UV-C sources are here arranged closer to the outer sides of the covering elements. For a power of about 19 mW each as in the embodiment described above, it has been seen that a fluence of about 15 $mJ/cm^2$ can be reached in about 14 minutes i.e. about twice as compared to when using five UV-C sources as described above.

Figure 4A:
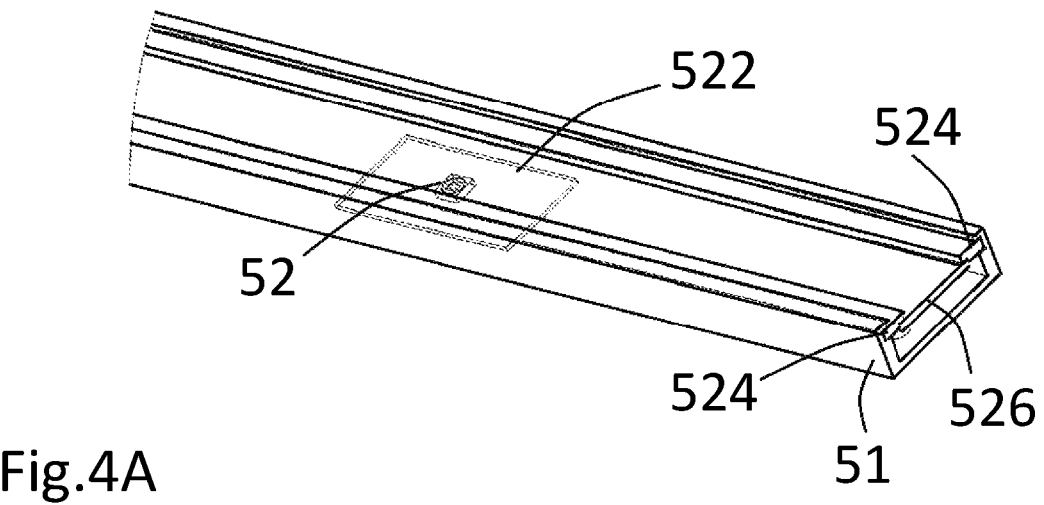
FIG. 4A is an enlarged view of a section of the UV-C source holding element in FIG. 4.
Figure 5:
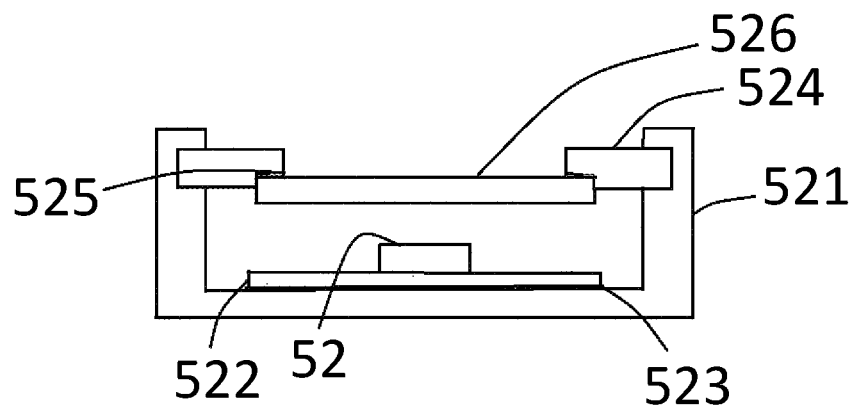
FIG. 5 is a transversal cross-sectional view through the UV-C source holding element with the UV-C source element in FIG. 4A.

FIG. 4A is an enlarged view of a part of the UV-C source holding element 51 holding one UV-C LED 52 arranged on a printed circuit board 522. A UV-C transmissible protective quartz glass or silica glass element 526 is held at a distance from the LED sources 52 by a protection holding element 524, which will be more thoroughly described with reference to FIG. 5, which is a cross-sectional view through the holding element 51 and the UV-C source 52 shown in FIG. 4A. The UV-C source holding element 51 comprises a bottom portion and surrounding walls, the UV-C LED 52 being provided on printed circuit board 522 connected to said bottom portion of the holding element 51, here by means of a thermally conductive adhesive 523. Protection holding element 524 is provided at a distance from the LED 52 and is slotted into the UV-C source holding element 51. The protection holding element 524 is so arranged that the inner edge thereof is located at a distance from the LEDs 52 (only one shown in FIGS. 4A,5) allowing passage of the UV-C light emitted from the LED 52. UV-C transmissible protective quartz glass or silica glass element 526 is slotted into the protection holding element 524 in order to protect the LED 52 and secured in place by means of an adhesive layer 525

According to still another embodiment, also for a food bar arrangement comprising e.g. 6 food product holding elements as described above, here e.g. six UV-C sources 52 comprising UV-C chips based on field effect technique, e.g. 10 mW power each, are provided on an UV-C source holding element 51 arranged at the front, e.g. as in FIG. 1 or FIG. 6. Also here the UV-C sources are arranged approximately between 23 and 29 cm distance from the food product upper surface, particularly about 27 cm. In this embodiment the UV-sources are arranged such that the distance from the outer side walls of the food bar, from the outer sides of the covering elements, to the closest UV-C sources is between approximately 65-75 mm, particularly about 72.5 mm, and in that the distances between the intermediate UV-C sources is approximately 165-245 mm. In one particular embodiment, to which the invention is of course not restricted, from one side of the food bar, the distance between UV-C sources may vary and be about 178 mm between the first and the second UV-C sources, about 238 mm between the second and the third UV-C sources, 190 mm between the two central (third and fourth UV-C sources), 238 mm between the fourth and fifth UV-C sources and 178 mm between the fifth and the sixth UV-C sources. The distances can be shorter as well as longer, a fixed distance can be used between adjacent UV-C sources or not, or the UV-C sources may be arranged more closely a certain regions.

The number of UV-sources can also be larger; if more UV-sources are added the exposure time, the activation time, required to achieve a desired inactivation of pathogens will be reduced. In one embodiment, instead of six UV-sources as discussed above, the number may be increased by three to six, giving e.g. a total of about 10-12 UV-sources, or more. For a larger food bar, or holding element below a covering element, the number of UV-C sources is normally larger and vice versa.

Generally, UV-C LEDs have a beam angle which may be up to 120°-130° or more, whereas UV-C chips based on field emission techniques have a smaller beam angle, e.g. up to 100°, which means that UV-C LEDs can be densely located, and still cover a wider area, which is advantageous.

It should be clear that a disinfection arrangement according to the present invention may use UV-C LEDs or UV-C chips or any other appropriate UV-C source with an appropriate form factor.

FIG. 6 shows a food bar arrangement 100' corresponding to the food bar arrangement shown in FIG. 1 with the difference that the disinfection arrangement in addition comprises a number of UV-C reflecting elements 56, e.g. made of or comprising polished Al or any other suitable material reflecting UV-C light, which is/are arranged to assist in the control (enhancement) of the UV-C fluence, or fluence rate, or to assist in directing the UV-C light from one or more of the UV-C sources towards certain predetermined or variable locations in the food bar, e.g. toward the front of the holding element. In this particular embodiment it is arranged along the lower part of the cooling arrangement 200, preferably the part thereof not covered by the covering element rear section when it is in a closed position. Reflecting material could also, additionally or alternatively, be provided on e.g. the side walls of the covering elements and/or in parallel with the UV-C-holding arrangement, but adjacent a covering element 10A,10B edge. Since all other elements have already discussed with reference to FIGS. 1,2 and 3, they will not be further discussed here.

Figure 7:
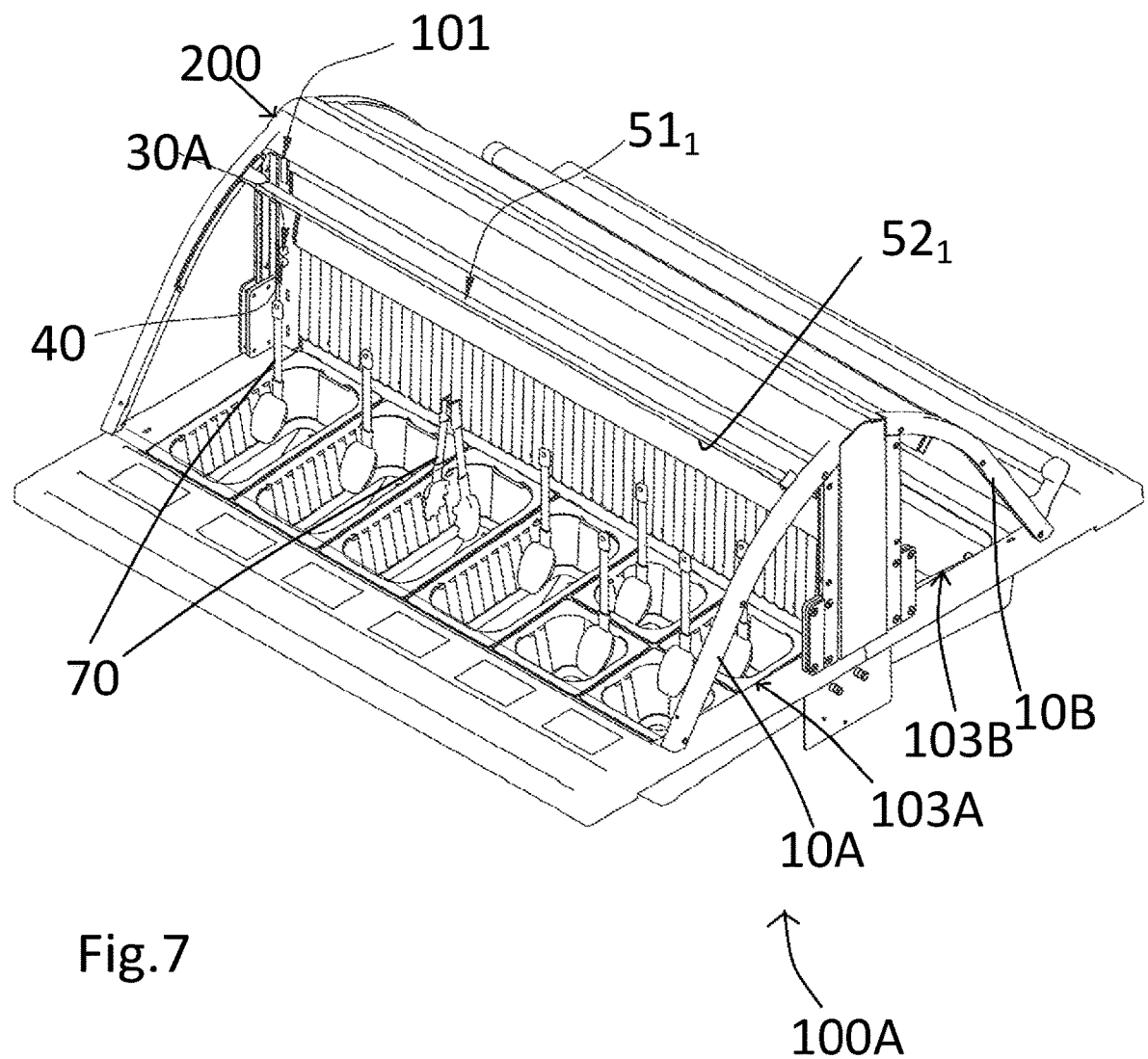
FIG. 7 is a schematic overview in perspective of a food bar arrangement with a disinfection arrangement according to a third embodiment of the invention.

FIG. 7 shows an exemplary food bar arrangement 100A with a disinfection arrangement according to a third embodiment of the present invention. The difference to the embodiment shown in FIG. 1 is that the disinfection arrangement comprises UV-C source holding elements 51$_1$ for holding UV-C sources 52$_1$ for each food product holding element which are provided on the cooling arrangement 200, such that the UV-C sources will be located below the covering element 10A, 10B rear sides or the covering element having only lower rear sides, the UV-C holding element being located above such rear sides, or the rear sides being made of a UV-C transparent material, facing the food products.

Alternatively the inner sides of the covering element 10A upper rear sections carry an UV-C holding arrangement. In all other aspects the elements, functions and freely variable options correspond to those already described with reference to FIG. 1 and the elements therefore bear the same reference numerals and will not be described in further detail.

Figure 8:
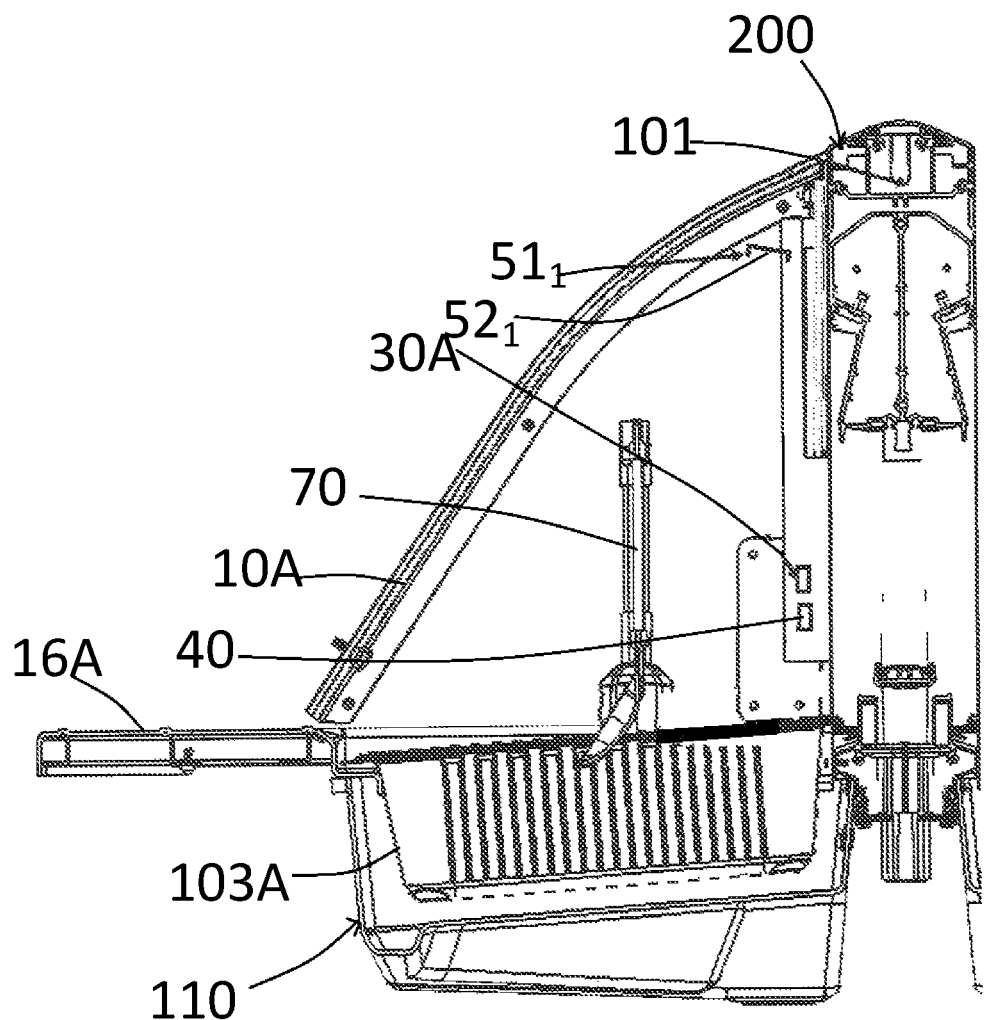
FIG. 8 is a cross-sectional view taken through a product holding arrangement with a covering element of the food bar arrangement shown in FIG. 7.

FIG. 8 is a cross-sectional view taken through one covering element 10A and part of the cooling arrangement 200 of the food bar arrangement 100A shown in FIG. 7, with the UV-C holding element located at the rear of the holding elements. In other respects similar to the view shown in FIG. 3 of the food bar arrangement shown in FIG. 1.

Figure 9:
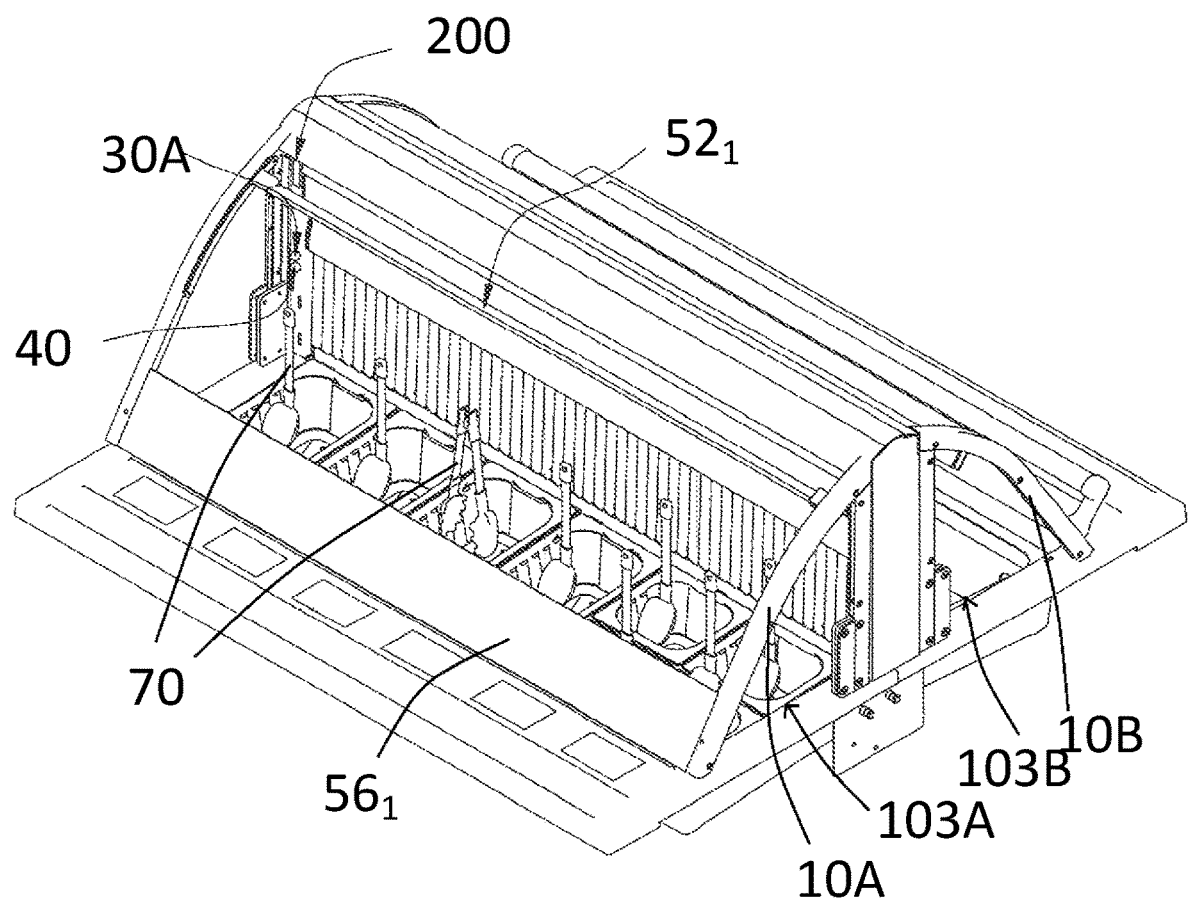
FIG. 9 is a schematic overview in perspective of a fourth embodiment of a bar arrangement similar to FIG. 7 which additionally is provided with an UV-C reflecting arrangement.

FIG. 9 shows a food bar arrangement 100A' corresponding to the food bar arrangement 100A shown in FIG. 7 with the difference that the disinfection arrangement in addition comprises a number of UV-C reflecting elements 56$_1$, e.g. made of or comprising polished Al or any other suitable material reflecting UV-C light, which is/are arranged to enhance the fluence, or irradiation, or to assist in directing the UV-C light from one or more of the UV-C sources towards certain predetermined or variable locations in the food bar, thus assisting in controllability of UV-C exposure. In this particular embodiment it is arranged along the lower front part of the each covering element 10A,10B adjacent the tray slides 16A,16B in a closed position of the covering elements 10A,10B. Reflecting material could also, additionally or alternatively, be provided on e.g. the side walls of the cover elements. Since all other elements have already discussed with reference to FIGS. 1-8 they will not be further discussed here.

FIG. 10 is a simplified overview of a system according to the invention comprising UV-sources 52 in communication with activating/deactivating means 40 e.g. comprising a switch, which in turn is connected to covering element sensing means (not shown here). The activating/deactivating means 40, or the switch, also communicates directly with indicating means 31 as discussed earlier in the application. The activating/deactivating means 40 communicate with a UV-C driver 41 communicating with the computing unit 81 of a local control station 80. The computing unit 81 of the local control station 80 communicates with a remote or central server 880 of a central control system, monitoring and control being allowed locally as well as remotely, and is connected to local portable or stationary unit 804 user interface. The local portable or stationary unit 804 may alternatively, or additionally, be in communication with the central server 880 (indicated through a dashed line).

A food bar arrangement exemplary operation logic diagram is schematically shown in FIG. 11 for illustrative purposes. When the food bar arrangement is opened, or prepared for getting ready for customer access 1001, this initiates or presupposes a deep cleaning operation 1010. Information about a deep-cleaning operation having been done, and information about at which it has been done is provided to the UV-C exposure control system, 1000. A deep-cleaning step may include providing for UV-C exposure (by controlling activation and activation times and which UV-sources are activated etc. to achieve a 99,99% inactivation of target, pre-set, pathogens. Deep-cleaning can be initiated automatically through a local or central control system as discussed earlier, or manually initiated a user interface of either at a local control system or of a central control system. Alternatively, or additionally, it may be initiated from a fixed or stationary unit 804 in communication with the local control system.

Each covering element opening event, leading to UV-C deactivation, and as registered by covering element sensing means, 2001, is by controller logic of a computing unit in the local control system, or in a central control system, is registered as an increase in risk in the risk calculation, and translated or converted to an updated, current, required UV-C exposure time, 2010. Information relating to the increased risk is, in the computing unit of the local or central control system of the UV-C exposure control system, 1000, and depending on whether a 90%, 99% or 99.99% inactivation is required, the activation of UV-C sources will be controlled depending thereon, or any other appropriate actions, such as covering element blocking for a certain time period.

Preferably is also scheduled for time based disinfection events, 3001 and depending on how much time has elapsed since a preceding time based or scheduled disinfection event, a risk value may be added in the controlling logic of the local or central computing unit to account for a risk of pathogens through incoming air for cooling or ventilation purposes, i.e. not related to covering element opening events, 3010. The risk contribution is provided to, or used in, the computing unit of the local or central control system of the UV-C exposure control system, 1000, and depending on whether a 90%, 99% or 99.99% inactivation is required, the activation of UV-C sources will be controlled depending thereon, or any other appropriate actions, such as covering element blocking for a certain time period, performing an extraordinary time based cleaning; e.g. preventing user access and activating the disinfection arrangement. Thus, the risk is increased each time there is an event (e.g. covering element opening event) at which pathogens could be introduced, and the risk is also increased as time goes by to account for the risk of pathogens in the air cooling the system.

As an example might each covering element opening event involve an increased need of UV-C fluence, or dose, of 6 mJ/cm$^2$. This can be translated into time by multiplication the average fluence or irradiance over the surface, by time. For example, a system with a fluence rate of 0.01 mW/cm$^2$, the increase in time would be 10 min. If the covering element is opened during that time, the risk is reset, and the 10 min period starts over. If a time-based condition has been set in the remote server (or in the local server) to 10 mJ/cm$^2$ per hour, and if 10 mJ/cm$^2$ has not been supplied during the last hour, the UV-C sources will be activated for as long as required to arrive at a fluence of 10 mJ/cm$^2$, or the time reset. It should be clear that the invention is not limited to the figures or measures, the intention merely being to give an example.

Figure 12:
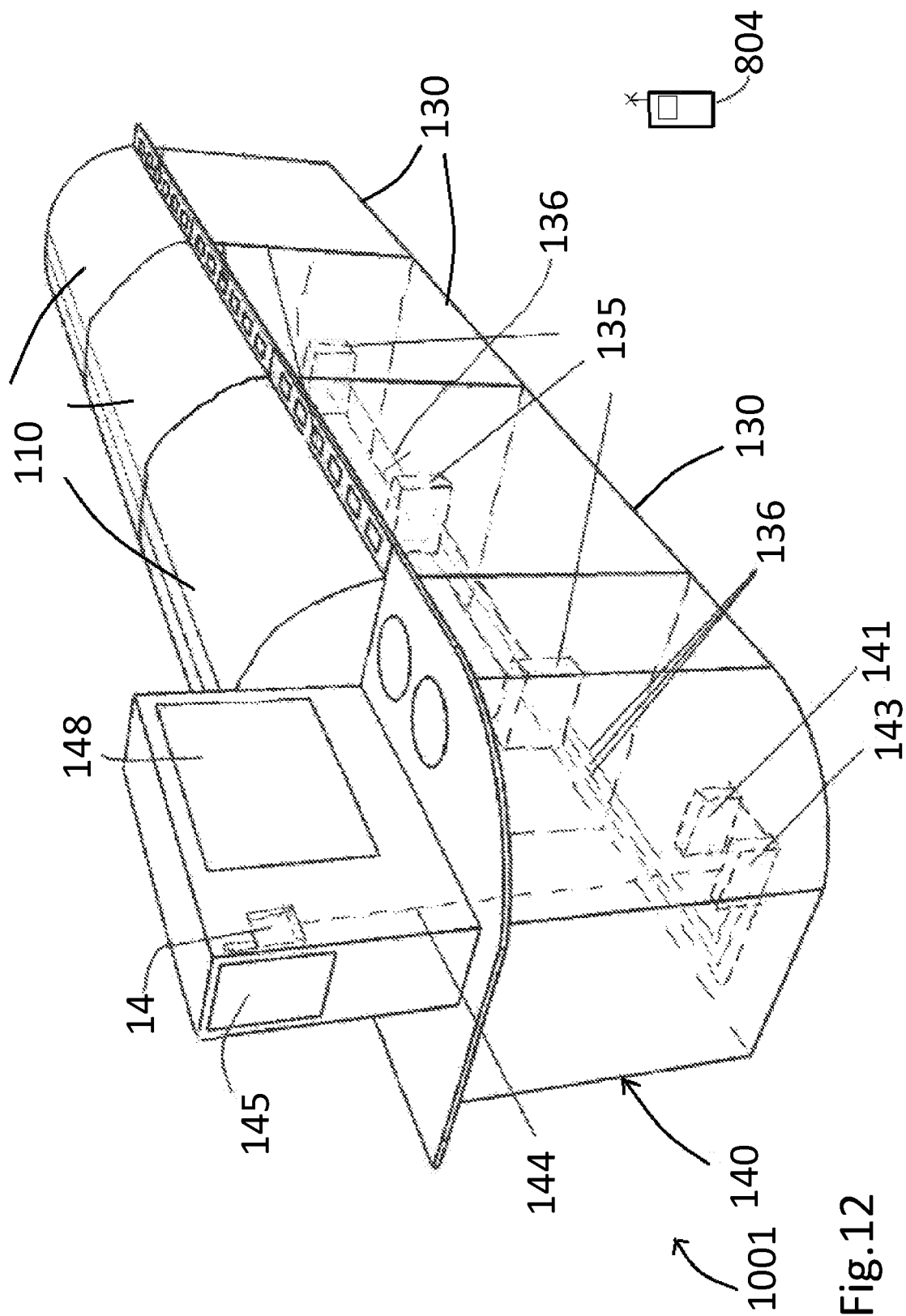
FIG. 12 is a very schematic view in perspective of a food bar arrangement assembly comprising a number of functional food product holding stations and a local station serving unit.

FIG. 12 schematically illustrates an implementation in which a plurality of food bar arrangements 130 form a food bar arrangement assembly 1001, each food bar arrangement, here also called functional product holding station 130, as described with reference to the preceding embodiments comprising one or more product holding arrangements, optionally cabinets 300, a machine room, a refrigerating arrangement and a cooling system with cooling arrangements, but which here are connected to a station serving unit 140 comprising the local monitoring and control system 80 comprising a local server, a computing arrangement and a user interface allowing local monitoring and control of the food bar arrangements 130 of the food bar arrangement assembly. The station serving unit 140 may comprise or be arranged in or in association with a food bar arrangement service station for accessories such as bowels or packages for food products, cutlery, a hand disinfection dispenser, dressings, spices etc., and the local server may be in communication with a central or the remote server 880 e.g. of a central monitoring and control system also handling other monitoring and controlling functions (e.g. as described in WO2016/175690 also referred to earlier in the application) over dedicated Application Programming Interfaces (APIs).

In FIG. 12 food product display 145 and an additional display 148 are shown, which are optional, and not necessary for the functioning of the inventive concept.

The station serving unit 140 may comprise a wireless router for external Internet connection, and internal connection with a stationary or portable local unit 804, and optionally with a product display (not of importance for the functioning of the inventive concept).

The fixed or portable unit 804 may comprise a stationary or portable computer, a laptop, a palmtop, an iPod, e.g. an iPod touch, an iPad or any other appropriate computing device. e.g. with a scanning functionality or connected to a scanner. The stationary or portable local unit 804 is intended to be used by local staff persons. In advantageous a stationary or portable local unit 804 used as a tool for monitoring and control of food products and the food bar, e.g. as described in WO2016/175690 referred to earlier in this application, e.g. for food product storing, replacement and positioning in the food bar arrangement, it here also comprises a user interface and may be used for monitoring and controlling the disinfection arrangement, and is connected to the local station server 80 in the station serving unit 140 and/or a central or remote server 880 of a monitoring and controlling system 800. The stationary or portable local unit 804 is e.g. wirelessly connected to the station serving unit 140. In an advantageous embodiment a stationary or portable unit 804 which in a known system is used for controlling one or more of shelf life, expiration dates of the food product, or remaining time until expiry, reminders concerning products for which the best before date has passed, alarms concerning the functioning of cooling, opening arrangements, temperatures, fans etc., quality and safety rounds, and reminders when such are to be performed, statistic, setting appropriate operation state, e.g. normal operating state, is here also used for controlling the disinfection arrangement, e.g. activation/deactivation of the disinfection arrangement/UV-C-sources, monitoring operation state, eventual faults in disinfection arrangement, malfunctioning UV-C sources, cleaning state, deep cleaning state, night operation state, fulfilment of exposure requirements, setting of fluence dose for specific pathogens etc.

The station serving unit 140 here comprises a router, station serving unit switch 143 for interconnection of the wireless router 14 for external Internet connection, and for internal interconnection, with the local monitoring and control computing 80 (not shown in FIG. 12; see FIG. 11) and the food bar arrangement product holding stations 130, preferably via a TCP/IP cable 144 (Transmission Control Protocol/Internet Protocol), for controlling and monitoring, in addition to the cooling, temperatures, the covering elements, fans, doors etc., also the disinfection arrangement including activation/deactivation, UV-C fluence (rate) depending on covering element position and/or motion status, activation/deactivation time and risk status, calculating the risk status, (or receiving risk status from the central server 880 managing a plurality of food bar arrangement assemblies, e.g. at different premises, e.g. a Raspberry Pi computer or a Variscite compute module on a customized carrier card.

The station serving unit 140 server (of local control system 80) in one embodiment, to which the invention of course is not limited, comprises a Raspberry Pi computer with a Linux operations system, or a Variscite compute module on a customized carrier card, with which the stationary or portable local unit 804 communicates. It also handles synchronization with the central server 880 (FIG. 10) and communication with the functional product holding stations 130 via cable using TCP/IP. A VPN server (not illustrated) may be provided to assure a secure external connection for advanced maintenance and service.

The station serving unit 140 server in an advantageous embodiment provides functional product holding stations 130 identity information to the central server 880 and information about status of products, set and current operation status in general and UV-C fluence and pathogen or contamination related information in particular including frequency and/or length of deactivation of UV-sources e.g. due to opening of covering elements, current status of said products, shelf life etc., and current status relating to the operation of the food bar, e.g. cooling capacity, sensed temperatures, fan rotation speeds etc.

Advantageously the entire system works without Internet connection during limited time periods, and synchronization of data takes place when Internet connection is available, the control at least then being temporarily being taken over locally.

Each functional product station 130 here comprises an electrical unit 135 in communication with the switch 143 of the station serving unit 140 via cables 136. The functional product holding station 130 provides information to the station serving unit 140 server about the registered current temperatures of all local temperature, humidity sensors, air flow related information, fan operation, compressor status, opening status and covering element opening/closing events and lengths thereof of, optionally UV-C fluence or fluence rate etc.

The hardware of the electrical units 135 in one embodiment comprises a dedicated circuit board and a computer, e.g. Raspberry Pi appropriately specified or a Variscite compute module on a customized carrier card, and may comprise software for handling the controlling referred to above in communication with the local server 80; e.g. UV.C light exposure control, covering elements, temperature monitoring by means of temperature sensors, humidity sensors, fans (air flow) etc.

The central server 880 may form part of a monitoring and controlling system 800 and be located at the service provider premises or elsewhere, holding information about all products in all food bar arrangement assemblies, current up to date information and information data history, information about the food bar arrangements, alarm information etc. It may be in communication with a service provider information handling and storing means holding information about clients (users, e.g. stores holding food bar arrangements 100), food product suppliers, data forming part of the service provider business system. Preferably also a dashboard is provided which comprises a web portal to which can be logged in for access to information. The dashboard may provide a monitoring function for monitoring and controlling of functioning of the food bar arrangements, UV-C light exposure systems, cooling system, covering arrangements, fans etc., UV-C related risk alarms, other alarms, measures taken in case of alarms, event reports, local sensor data, due dates or times for rounds, completion of rounds, deep cleaning, etc. Particularly it comprises a reporting tool, for storing data concerning the food bar arrangement and the monitoring or controlling system including the disinfection control system. As an example, the service provider (e.g. a remote, common service provider for several food bar arrangements or stores holding food bar arrangements and providing the service of monitoring and controlling the food bar arrangements, food products logistics, delivery and food and operational safety etc.) can, when logging in, see data represented and displayed in any desired manner concerning all stores having a food bar with a monitoring and controlling system, such as the UV-C exposure related data, temperature sensor data, relative humidity sensor data, covering element opening/closing related data, UV-C source activation/deactivation events, and other data.

A monitoring and alarm function displayed via a dashboard in the said embodiment provides a means for the remote monitoring and control of the operation of a plurality of local food bar arrangements or assemblies since data is continuously or at predetermined intervals is delivered for/from all food bar arrangements or functional product holding stations 130 of food bar arrangements Alarm information is automatically provided in real time. If there is an alarm reported regarding a food bar arrangement, or assembly, this can be seen via the central monitoring and alarm function. Reports regarding the activation/deactivation of UV-C sources, opening/closing events of covering elements, optionally UV-C fluence related measurements, etc. may be provided from each food bar arrangement 100 or functional product holding station 130 with a regular time interval, e.g. between 1 and 5 minutes, and for measurement or sensor data acceptable intervals may be defined such that there is no data reported within a given interval, an indication will be generated, and if no satisfactory action has been taken within a predetermined time interval, an alarm is generated. In advantageous embodiments an alarm may first be provided to the stationary or portable local unit 804, and if no measures are taken within a given time period, the alarm is provided to the central server 880 for generation of an alarm presented on the start page on the dashboard. For different alarms, different intervention levels and measures can be defined, as well as different escalation options can be provided for different types of alarms. An alarm can be silenced during the taking of counteractions, but logs are provided until the problem has been solved. An alarm can only be reset when satisfactory log data is generated.

Further alarms can be provided from the service provider on the dashboard web portal via the central server 880 to one or more station serving units 140 or to the respective stationary or portable local units 804 or as e-mails or as SMSs.

As referred to above contamination risk calculations may performed either in local computing arrangements of local control systems; otherwise data is communicated to the central server 880 from the station serving unit 140 or from the functional product station 130, and the calculations are performed at the central server 880 based on said received data.

It is a particular advantage of the invention that remote handling, monitoring and control of a food bar arrangement, or a plurality of assemblies of food bar arrangements, is enabled, by means of a central or remote dedicated control comprising at least the disinfection arrangement operation is concerned depending on current information from the local stations.

It should be clear that the invention is not limited to the specifically illustrated embodiments, but that it can be varied in a number of ways within the scope of the appended claims, and implemented with, or comprise, different types of food bar arrangements. In alternative implementations so called far-UV-C, wherein the wavelength of the UV-light emitted by the UV-sources is about 222 nm could be used, which may reduce the strictness in the requirements of protection by means of deactivation when a covering element is opened. In still other implementations UV-sources are used wherein the wavelength of the UV-light emitted is about 280-290 nm, i.e. actually UV-B sources.

The present invention particularly concerns food bar arrangements where the food products are offered in loose weight or as loose products, are held in disposable or reusable pans, canteens or similar food product holding means holding several portions which are not pre-packed and portioned and from which an end user, or staffs persons, can take a desired amount or portion e.g. using serving utensils such as spoons and tongs or similar, where the food products contained in the canteens, pans or similar, and serving utensils, pans etc. hence run the risk of being exposed to pathogens while a accessed by an end user or a staffs person.

The invention claimed is:

1. A food bar arrangement comprising a salad bar or an open food display from which a customer can pick and compose a meal from a number of different food products, the food bar arrangement comprising:
at least one food product holding arrangement each with at least one product holding element for holding fresh food products, an openable covering arrangement adapted to, in a closed position, cover and protect the food products from access and exposure to pathogens, the or each covering arrangement comprising at least one covering element which is arranged to be transferable from a closed position, in which food products are covered, preventing access, to an open position in which access to the food products is admitted, and vice versa, covering element sensing means is provided for the, or each, covering element, which covering element sensing means are adapted to register at least an activation of, or a position of, or a movement of, the covering element, when the covering element is in an open position or is starting to move towards an open position and/or vice versa;
a disinfection arrangement comprising a plurality of UV-C sources arranged to, in an activated state, expose or irradiate the food products kept in the/each food product holding element, with UV-C light at a wavelength for inactivation of pathogens, at least one UV-C source holding element in each product holding element for holding a number of said plurality of UV-C sources, and a disinfection control system for controlling the disinfection arrangement, said disinfection control system is in communication with the covering element sensing means and a activating/deactivating arrangement for activating/deactivating the plurality of UV-C sources, separately, in groups or all, allowing control of at least the activation/deactivation of the UV-C sources of each food product holding element, at least some of the UV-C sources are arranged to expose food products covered by a covering element are deactivated by the activating/deactivating arrangement when the activating/deactivating arrangement is detected by the covering element sensing means of said covering element(s), when the covering element(s) is to be opened, intended to be opened, or is moved towards an open position,
wherein the plurality of UV-sources are arranged to provide a fluence of 15 to 24 mJ/cm² over a whole surface to be disinfected within a predetermined time period to provide at least a 2-log inactivation of pathogenic microorganisms,
wherein the disinfection arrangement comprises, for one or more of the food product holding elements, UV-C light absorbing material arranged to prevent UV-C light from reaching predetermined or variable areas, and/or areas outside the food bar arrangement where free user/end user access is permitted,
wherein the covering elements are made of a material and/or have a thickness capable of blocking UV-C light, at least to a predetermined level, and of withstanding UV-C light exposure, and
wherein by the disinfection control system, UV-C fluence and/or fluence e rate, UV-C source activation/deactivation, updated required activation time of the UV-C sources of the, or each, food product holding element, is/are automatically controlled at least in dependence on the position or movement of the covering elements of the food product holding element, an established, estimated or calculated, current fluence, and air flow, a desired UV-C fluence or fluence rate is set depending on a pathogen, and the disinfection control system comprises or is in communication with a local or central computing arrangement executing a risk calculation algorithm, for calculating a current, up-to-date potential exposure risk based on information for the or each for one or more of the food product holding arrangement, and in the UV-C source fluence or fluence rate is controlled based on said information to monitor and control disinfection measures in real-time.

2. The food bar arrangement according to claim 1, wherein the wavelength of the UV-light emitted by the UV-sources is 250-280 nm.

3. The food bar arrangement according to claim 1, wherein the UV-sources are arranged and controlled by the disinfection control system to provide at least a 3 log inactivation of pathogenic microorganisms.

4. The food bar arrangement according to claim 1, wherein the disinfection control system comprises or is in communication with an UV-C exposure control system arranged to measure the time the UV-C sources of the, or each, food product holding element are activated and/or deactivated, and/or measured or estimated current UV-C fluence or fluence rate, and to provide feedback on the measured time and/or measured or estimated fluence or fluence rate for controlling the UV-C source fluence or fluence rate and/or activation period of one or more of the UV-C sources, at least depending on said feedback.

5. The food bar arrangement according to claim 1, wherein the UV-C sources comprise UV-C LEDs or UV-C chips based on field emission.

6. The food bar arrangement according to claim 1, wherein the covering element sensing means is arranged to provide a signal to the disinfection control system each time the covering element is detected to be opened or a signal is provided when the covering element will be opened, and/or closed, when a covering element is or is intended to be opened, at least some of the UV-C sources are inactivated or the fluence rate is reduced and a timer is started/stopped, and when a covering element is closed, the timer is stopped/started and at least some of the UV-C sources are activated, and the disinfection control system is arranged to, at least upon reception of a signal from the covering element sensing means, recalculate a current activation period or fluence rate required for obtaining a predetermined UV-C fluence based on activation or deactivation time information provided by said timer, and to, in dependence thereon, control and update the length of activation or illumination period and/or UV-C source fluence rate.

7. The food bar arrangement according to claim 6, wherein the UV-C exposure control system comprises a means for measuring the time elapsed since the last activation and/or deactivation of individual UV-sources or of fixed or variable groups of UV-sources, and to, depending on whether a preset UV fluence has been achieved or not, or on which UV-fluence currently has been reached, activating at least some of the UV-sources, and to control the required activation period of the UV-sources and/or the required UV fluence rate depending on current measured, estimated or calculated UV-C fluence.

8. The food bar arrangement according to claim 1, wherein the disinfection arrangement comprises, for one or more of the food product holding elements, a number of UV-C reflecting elements, arranged to enhance the UV-C fluence rate or to assist in directing the UV-C light from one or more of the UV-C sources towards certain predetermined or variable locations in the food product holding elements.

9. The food bar arrangement according to claim 1, wherein the disinfection arrangement comprises, for one or more of the food product holding elements, one or more lens elements arranged for assisting in controlling, reducing or enhancing, the effective energy transfer from one or more UV-C sources, on given surface areas.

10. The food bar arrangement according to claim 1, wherein the disinfection control system comprises, for one or more of the food product holding elements, alarm means arranged to indicate non-achievement or risk of non-achievement according to a predetermined threshold level of a predetermined UV-C fluence or dose pre-set as a required fluence or dose for inactivation of at least a given pathogen.

11. The food bar arrangement according to claim 10, wherein the alarm means are arranged to be in communication with covering element locking means arranged to automatically block a covering element of a food product holding element, in a closed position until the predetermined UV-C fluence or dose pre-set as a required fluence or dose for inactivation of at least a given pathogen or until a set minimum threshold value has been reached.

12. The food bar arrangement according to claim 1, further comprising indicating means arranged to indicate when one or more of the UC-sources is/are in an activated state.

13. The food bar arrangement according to claim 1, wherein the total fluence rate or irradiance of the UV-C sources of the disinfection arrangement, for a food product holding element, is about $0.08\ W/m^2$, $8\ \mu J/s \cdot cm^2$.

14. The food bar arrangement according to claim 1, wherein the disinfection control system comprising a UV-C light exposure control system comprises a local control system which is connected to a portable or stationary local unit comprising a user interface allowing local monitoring and control of at least the UV-C sources, activation time, UV-C source fluence rate, selection of required UV-C source fluence or total fluence depending on pathogen, via said portable or stationary local unit or a user interface of said local control system.

15. The food bar arrangement according to claim 1, wherein the disinfection control system comprising a UV-C light exposure control system is connected to a remote server or a central server allowing remote monitoring and control of at least the UV-C sources, activation time, UV-C source fluence rate, selection of required total UV-C fluence depending on pathogen.

16. The food bar arrangement according to claim 1, wherein for the at least one food product holding element, at least some of the UV-C sources are arranged on an inner long side of the covering element, and/or on inner side walls of the covering element, and/or on inner rear upper side wall portions thereof, and directed towards the food products the at least one food product holding element, and are disposed on an UV-C source holding element comprising a ledge or similar attached to the covering element and/or on a mounting structure of the food bar arrangement, and/or some or all of the UV-C sources of are arranged on a cooling arrangement arranged at the rear portion of the at least one covering element.

17. The food bar arrangement at least according to claim 16, wherein the covering element sensing means are adapted to register a position of or a movement or intention of movement of the at least one covering element, said at least one covering element comprising a front section, a rear section, and two outer side sections, disposed between, and interconnecting, the front section and the rear section along opposite outer edges thereof, said rear section extending in a substantially vertical plane, a mounting structure comprising at least first and second mounting elements extending in a substantially vertical direction, said at least one covering element is arranged be movable in a vertical direction with respect to the mounting elements, or by means of the mounting elements, allowing the covering element to move between a lower, closed, position and an upper, open position, and hence to perform a vertical translational movement with respect to two fixed side sections of the food bar arrangement is arranged when the covering element is in a closed position, the outer side sections of the covering arrangement will be disposed adjacent to, and substantially located in parallel with said fixed side sections, and when the covering element is in an open position, the fixed side sections will act as side cover sections or side walls.

18. The food bar arrangement according to claim 1, further comprising a cooling arrangement located close to, and above, product holding element back wall(s), and adjacent a rear section of the openable covering element(s), and at least some of the UV-C sources are arranged in an upper part of said rear wall of the openable covering element(s) or in the upper parts of the cooling arrangement.

19. The food bar arrangement assembly comprising a number of food bar arrangements as in claim 1, wherein each food bar arrangement comprises station serving unit comprising a local monitoring and control means comprising a local server is in communication, via a local network, with a number of local product holding stations each comprising one or more product holding elements, activation/deactivation means for switching on/off one or more UV-C sources in said local food product holding stations, and further is in communication with the remote or central server is a server of, monitoring and controlling system of the assembly of food bar arrangements, and further is in communication with said at least one portable or stationary unit comprising a managing and control functionality by means of a wireless local network, said station serving unit comprises a wireless router for external Internet connection and internal connection with said portable or stationary control unit, and the UV-C sources of the local food product holding stations can be controlled via a user interface of the local monitoring and control system server and/or via a user interface of the portable or stationary local unit communicating with the local server.

20. The food bar arrangement assembly according to claim 19, wherein the station serving unit server is adapted to hold information about technical and operational parameters including covering element opening/closing event related information of the local product holding stations with which the station serving unit server is in communication, said information, dynamically or continuously, and/or at occurrence of predetermined events, is updated a least through information about the operational state or measured technical parameters from the functional product holding stations, and through information from the remote, central, server, the local monitoring and control system server also is adapted to provide the central server at least with current status information received from the station serving unit local monitoring and control system server about the local food product holding stations and alarm information substantially in real time, and to use said information to calculate an updated needed UV-C fluence and to control the UV-C source activation/deactivation, and the portable or stationary unit is adapted to receive and hold at least part of the information held in, and provided to, the station serving unit local server, said portable or stationary unit comprising an interactive user interface also allowing handling, control and monitoring of at least the UV-C source activation/deactivation, or fluence rate.

21. The food bar arrangement according to claim 1, wherein the predetermined period is 60 minutes.

* * * * *